United States Patent
Ryu et al.

(10) Patent No.: US 11,893,269 B2
(45) Date of Patent: Feb. 6, 2024

(54) APPARATUS AND METHOD FOR IMPROVING READ PERFORMANCE IN A SYSTEM

(71) Applicant: SK hynix Inc., Gyeonggi-do (KR)

(72) Inventors: Jun Hee Ryu, Gyeonggi-do (KR);
Kwang Jin Ko, Gyeonggi-do (KR);
Young Pyo Joo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 64 days.

(21) Appl. No.: 17/686,915

(22) Filed: Mar. 4, 2022

(65) Prior Publication Data
US 2023/0081829 A1  Mar. 16, 2023

(30) Foreign Application Priority Data
Sep. 15, 2021 (KR) .................. 10-2021-0123181

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 10,025,522 B2 | 7/2018 | Helmick | |
| 10,649,776 B2 | 5/2020 | Navon et al. | |
| 2004/0143706 A1* | 7/2004 | Johns | G06F 12/128 711/E12.072 |
| 2006/0224784 A1* | 10/2006 | Nishimoto | G06F 3/0659 710/36 |
| 2020/0004685 A1 | 1/2020 | Guim Bernat et al. | |
| 2020/0192715 A1 | 6/2020 | Wang et al. | |

* cited by examiner

*Primary Examiner* — Jae U Yu
(74) *Attorney, Agent, or Firm* — IP & T GROUP LLP

(57) ABSTRACT

A memory system includes a memory device and a controller. The memory device includes plural storage regions including plural non-volatile memory cells. The plural storage regions have a different data input/output speed. The controller is coupled to the memory device via at least one data path. The controller performs a readahead operation in response to a read request input from an external device, determines a data attribute regarding readahead data, obtained by the readahead operation, based on a time difference between reception of the read request and completion of the readahead operation, and stores the readahead data in one of the plural storage regions based on the data attribute.

20 Claims, 24 Drawing Sheets

APPARATUS AND METHOD FOR IMPROVING READ PERFORMANCE IN A SYSTEM

CROSS-REFERENCE TO RELATED APPLICATIONS

This patent application claims the benefit of Korean Patent Application No. 10-2021-0123181, filed on Sep. 15, 2021, the entire disclosure of which is incorporated herein by reference.

TECHNICAL FIELD

Embodiments of the present disclosure described herein relate to a data processing system, and particularly, to an apparatus and method for enhancing readahead performance in the data processing system.

BACKGROUND

A data processing system includes a memory system or a data storage device. The data processing system can be developed to store more voluminous data in the data storage device, store data in the data storage device faster, and read data stored in the data storage device faster. The memory system or the data storage device can include non-volatile memory cells and/or volatile memory cells for storing data.

BRIEF DESCRIPTION OF THE DRAWINGS

The description herein makes reference to the accompanying drawings wherein like reference numerals refer to like parts throughout the figures.

DETAILED DESCRIPTION

Figure 1:
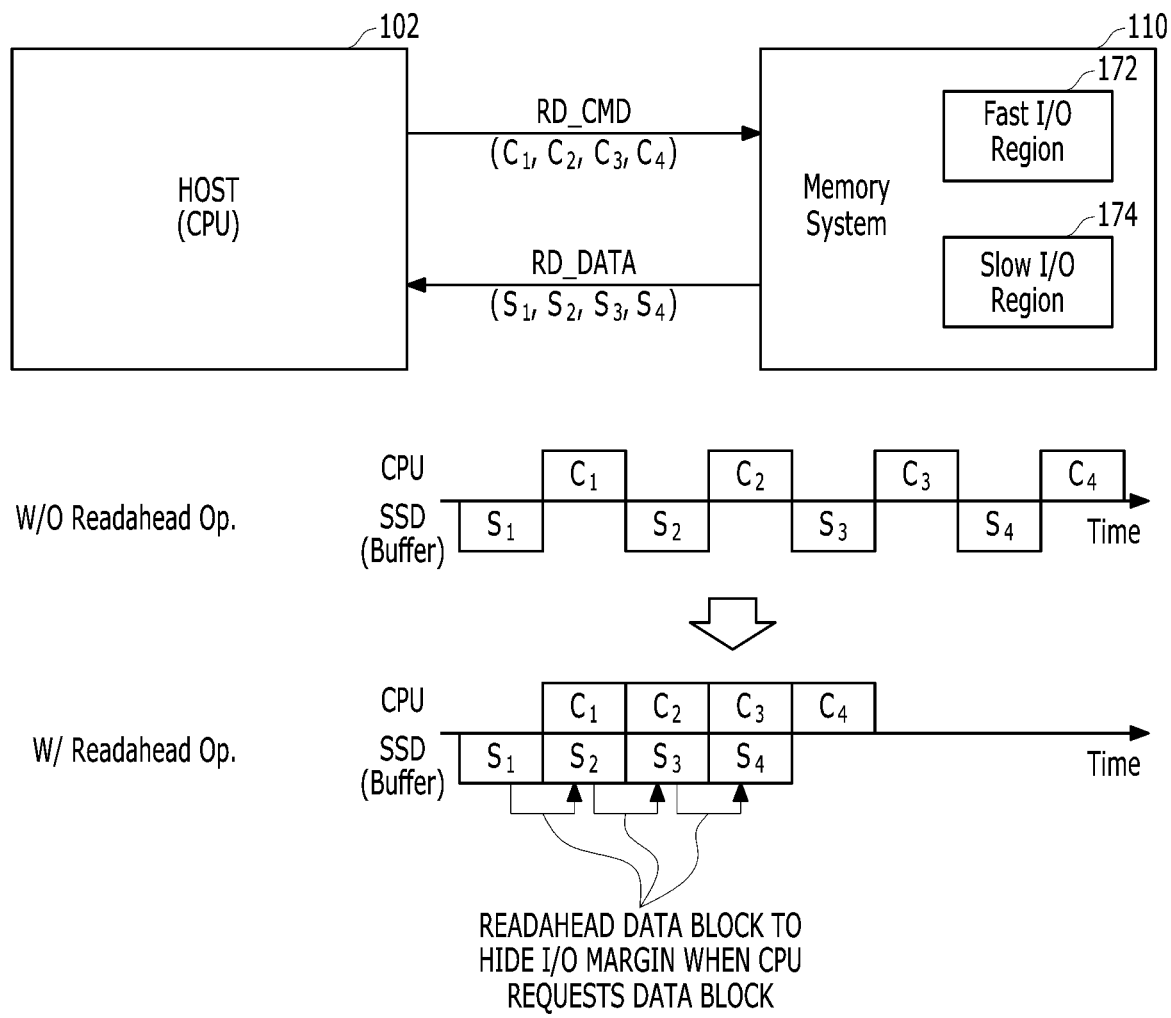
FIG. 1 illustrates a data processing system according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, operations, characteristics, etc.) included in "one embodiment," "example embodiment," "an embodiment," "another embodiment," "some embodiments," "various embodiments," "other embodiments," "alternative embodiment," and the like are intended to mean that any such features may be included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language include hardware, for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

Embodiments of the present disclosure can provide a memory system, a data processing system, and an operation process or a method, which can quickly and reliably process data into a memory device by reducing operational complexity and performance degradation of the data processing system and the memory system thereby enhancing usage efficiency of the data processing system and the memory device.

Embodiments of the present disclosure can provide an apparatus and a method for improving a readahead operation performed in a memory system so that the memory system advances a timing of transmitting read data requested by a host from the memory system to the host in the data processing system. The memory system can include a plurality of buffers having a different data input/output speed. In a procedure of storing readahead data prepared through a readahead operation in the plurality of buffers, the memory system can determine a data attribute of the readahead data based on a difference between a first timing of transmitting the read data to the host and a second timing of preparing the readahead data. Based on the data attribute, the memory system can determine a location of storing the readahead data among the plurality of buffers. Through this procedure, efficiency of the readahead operation performed with limited resources of the memory system can be improved.

While a type and a size of data requested from the memory system by the host in the data processing system may be various, a space of data buffer that can temporarily store the readahead data obtained through the readahead operation is limited. By calculating a degree of time reduction spent on outputting read data in response to a read request as a readahead coverage rate, data with a low coverage rate can be preferentially prepared in the data buffer. Through this, it is possible to determine which data is obtained in a limited space of the data buffer through the readahead operation among data stored in the memory device, so that data input/output performance of the memory system can be improved.

In an embodiment, a memory system can include a memory device including plural storage regions including plural non-volatile memory cells and having a different data input/output speed; and a controller coupled to the memory device via at least one data path and configured to perform a readahead operation in response to a read request input from an external device, determine a data attribute regarding readahead data, obtained by the readahead operation, based on a time difference between reception of the read request and completion of the readahead operation, and store the readahead data in one of the plural storage regions based on the data attribute.

In the memory system, a first storage region among the plural storage regions has a faster data input/output speed than a second storage region among the plural storage regions.

The controller can be configured to store the readahead data corresponding to the read request in the first storage region when the readahead data has a smaller size than a preset value.

The controller can be configured to store the readahead data corresponding to the read request in the second storage region when the readahead data has a larger size than or equal to the preset value.

The controller can be configured to store the readahead data corresponding to the read request in the first storage region when the reception of the read request is earlier than the completion of the readahead operation.

The controller can be configured to store the readahead data corresponding to the read request in the second storage region when the reception of the read request is later than the completion of the readahead operation.

The first storage region and the second storage region can individually include at least one memory block, at least one memory plane, or at least one memory die.

The first storage region can include a non-volatile memory cell storing data of a single bit, and the second storage region can include a non-volatile memory cell storing data of plural bits.

The second storage region can be used for storing user data, and the second storage region can be used for storing meta data associated with the user data.

The controller can be configured to recognize a pattern of read data requested by read requests input from the external device, determine the data attribute regarding the readahead data associated with the read data based on the pattern of the read data, and store the readahead data in one of the plural storage regions based on the data attribute.

The controller can be configured to determine the data attribute regarding the readahead data associated with first read data corresponding to a first read request, based on a time difference between receptions of the first read request and a second read request successively inputted following the first read request.

The memory system can further include a cache memory configured to temporarily store the readahead data. The controller can be configured to determine a timing of releasing or evicting the readahead data stored in the cache memory based on the time difference between the reception of the read request and the completion of the readahead operation.

The controller can be configured to assign one of plural eviction levels to the readahead data, adjust an assigned eviction level when the readahead data is accessed, and determine the timing of releasing or evicting the readahead data based on an adjusted eviction level.

The controller can be configured to change a degree of adjusting the assigned eviction level assigned to the readahead data when an amount of the readahead data having at least one or more specific eviction level among the plural eviction levels is greater than a reference.

The controller can be configured to determine the timing of releasing or evicting the readahead data based on a least recently used (LRU) policy when the readahead data stored in the cache memory has the same eviction level.

In another embodiment, a memory system can include plural memories having a different data input/output speed; and a controller configured to store readahead data obtained from the plural memories via a readahead operation in a buffer, and output read data among the readahead data stored in the buffer based on reception of a read request input from an external device. The controller can be further configured to determine a priority regarding the readahead data, obtained by the readahead operation, based on a time difference between reception of the read request and completion of the readahead operation, and store the readahead data in one of the plural memories based on the priority.

The controller can be configured to employ a virtual file system that associates a logical address scheme used by an external device and a physical address scheme for identifying locations of a plurality of non-volatile memory cells included in the plural memories and forms a virtual data structure based on a correlation corresponding to a data attribute or a data pattern of data stored in the plural memories. The virtual data structure can include a depth level, among plural depth levels of the correlation, which is assigned to the data stored in the plural memories.

The controller can be configured to, when the read request is input, perform the readahead operation to obtain data having a higher depth level than data corresponding to the read request.

The controller can be configured to: determine the priority based on a size of data corresponding to the read request; store the readahead data corresponding to the read request in a first memory among the plural memories, when the readahead data has a smaller size; and store the readahead data corresponding to the read request in a second memory having a slower data input/output speed than the first storage region among the plural memories, when the readahead data has a larger size.

The controller can be configured to: store the readahead data corresponding to the read request in a first memory among the plural memories, when the reception of the read request is earlier than the completion of the readahead operation; and store the readahead data corresponding to the read request in a second memory having a slower data input/output speed than the first storage region among the plural memories, when the reception of the read request is later than the completion of the readahead operation.

A first memory can have a faster data input/output speed than a second memory among the plural memories. The first memory and the second memory can individually include at least one memory block, at least one memory plane, or at least one memory die.

The controller can be configured to determine a timing of releasing or evicting the readahead data stored in the buffer based on the priority.

The controller can be configured to assign one of plural eviction levels to the readahead data, adjust an assigned eviction level when the readahead data is accessed, and determine the timing of releasing or evicting the readahead data based on an adjusted eviction level.

The controller can be configured to change a degree of adjusting the assigned eviction level assigned to the readahead data when an amount of the readahead data having at least one or more specific eviction level among the plural eviction levels is greater than a reference.

The controller can be configured to determine the timing of releasing the readahead data based on a least recently used (LRU) policy when the readahead data stored in the cache memory has the same eviction level.

In another embodiment, a data input/output system can include plural storage devices having a different data input/output speed; a cache memory; and a control device configured to: store readahead data obtained from the plural storage devices via a readahead operation in the cache memory; output read data, among the readahead data stored in the cache memory, to an application program based on reception of a read request input from the application program; determine a readahead attribute regarding the readahead data, obtained by the readahead operation, based on a first timing of the reception and a second timing of completion of storing the readahead data in the cache memory; and store the readahead data in one of the plural storage devices based on the readahead attribute.

The control device can be configured to detect a pattern of read data corresponding to the read request and use the pattern to determine the readahead attribute regarding the readahead data.

The control device can be configured to store the readahead data corresponding to the read request in a storage device having the fastest data input/output speed when the first timing is earlier than the second timing.

The control device can be configured to determine a timing of releasing or evicting the readahead data stored in the cache memory based on a difference between the first timing and the second timing.

The control device can be configured to assign one of plural eviction levels to the readahead data, adjust an assigned eviction level when the readahead data is accessed, and determine the timing of releasing or evicting the readahead data based on an adjusted eviction level.

The control device can be configured to change a degree of adjusting the assigned eviction level assigned to the readahead data when an amount of the readahead data having at least one or more specific eviction level among the plural eviction levels is greater than a reference.

The control device can be configured to determine the timing of releasing or evicting the readahead data based on a least recently used (LRU) policy when the readahead data stored in the cache memory has the same eviction level.

In another embodiment, an operating method of a circuit can include controlling a device to store data in a slow storage region; controlling a cache to cache the data from the slow storage region; providing the data from the cache in response to a read command; and controlling, after the providing, the device to move the data from the slow storage region to a fast storage region, which has a faster input/output speed than the slow storage region, when: the data has a smaller size than a threshold, or the read command is provided before the data is completely cached in the cache.

Embodiments of the present disclosure will now be described with reference to the accompanying drawings, wherein like numbers reference like elements.

FIG. 1 illustrates a data processing system according to an embodiment of the present disclosure.

Referring to FIG. 1, the data processing system can include a host 102 and a memory system 110. The host 102 can include a computing device, a mobile device, a network device, or the like. The memory system 110 can store data therein or output stored data to the host 102 according to a request from the host 102. In FIG. 1, a central processing unit (CPU) included in the computing device is shown as an example of the host 102, and a storage device (SSD) included in the computing device is shown as an example of the memory system 110. Configurations of the host 102 and the memory system 110 can vary according to an embodiment of the disclosure.

According to an embodiment, the memory system 110 may include plural non-volatile memory regions 172, 174 having a different data input/output speed. The first non-volatile memory region 172 and the second non-volatile memory region 174 may include a plurality of non-volatile memory cells. The first non-volatile memory region 172 and the second non-volatile memory region 174 can store data or output stored data in response to a request input from the host 102. For example, the first non-volatile memory region 172 can have a faster data input/output speed than the second non-volatile memory region 174. The first non-volatile memory region 172 and the second non-volatile memory region 174 can include at least one memory block, at least one memory plane, or at least one memory die. For example, the first nonvolatile memory region 172 can include a memory block including a non-volatile memory cell storing one-bit data, while the second non-volatile memory region 174 can include a memory bock including a non-volatile memory cell storing three-bit or four-bit data.

The host 102 may transmit a read command RD_CMD to the memory system 110. The memory system 110 may output read data RD_DATA in response to the read command RD_CMD transmitted from the host 102. In the data processing system described in FIG. 1, data input/output performance can be determined based on a transmission time (e.g., first operating margins, $S_1$, $S_2$, $S_3$, $S_4$) where the memory system 110 performs a data input/output operation to transmit the read data RD_DATA to the host 102 and a processing time (e.g., second operation margins, $C_1$, $C_2$, $C_3$, $C_4$) where the host 102 processes the transmitted read data RD_DATA. The host 102 can process the read data RD_DATA transmitted from the memory system 110. For example, the host 102 can perform an operation of displaying the read data RD_DATA to a user through a display device or the like. According to an embodiment, a time required for transmitting and receiving the read command RD_CMD or the read data RD_DATA between the host 102 and the memory system 110 might be least significant as compared with the first operation margins $S_1$, $S_2$, $S_3$, $S_4$ and the second operation margins $C_1$, $C_2$, $C_3$, $C_4$. The time for transmission/reception might be omitted in FIG. 1.

Referring to FIG. 1, a difference of data input/output performance in response to the read command RD_CMD input from the host 102 could be described based on two different cases, i.e., when the memory system 110 supports the readahead operation (W/Readahead Op.) and when the memory system 110 does not support the readahead operation (W/O Readahead Op.).

First, in the case (W/O Readahead Op.) when the readahead operation (Readahead Op.) is not supported regarding read commands RD_CMD input from the host 102, the memory system 110 can find and read first read data corresponding to a first read command RD_CMD from a storage device to transmit the first read data to the host 102 (during operation margin $S_1$). The host 102 receiving the first read data can process the first read data corresponding to the first read command RD_CMD and transmit a second read command RD_CMD requesting second read data to the memory system 110 (during operation margin $C_1$). In response to the second read command RD_CMD requesting the second read data, the memory system 110 can read the second read data from the storage device and transmit the second read data to the host 102 (during operation margin $S_2$). Thereafter, the host 102 can process the second read data and transmit a third read command RD_CMD requesting third read data to the memory system 110 (during the operation margin $C_2$).

When the readahead operation (Readahead Op.) is not supported in the memory system 100 (W/O Readahead Op.), the memory system 110 would find and read data corresponding to a read command RD_CMD of the host 102 after reception of the read command RD_CMD, to transmit read data corresponding to the read command RD_CMD to the host 102. That is, the memory system 110 should have the first operation margins $S_1$, $S_2$, $S_3$, $S_4$ spent on finding and reading data request by the host 102 after the read command RD_CMD is inputted. The host 102 can use second operating margins $C_1$, $C_2$, $C_3$, $C_4$ to process read data RD_DATA transmitted by the memory system 110. As shown in FIG. 1, when the host 102 has second operating margins $C_1$, $C_2$, $C_3$, $C_4$ each following the first operating margins $S_1$, $S_2$, $S_3$, $S_4$ of the memory system 110, data I/O performance of the data processing system might be not great.

However, in the case (W/Readahead Op.) when the readahead operation (Readahead Op.) is supported, the memory system 110 can find and read the first read data corresponding to the first read command RD_CMD input from the host 102 to transmit the first read data to the host 102 (during operation margin $S_1$ of the memory system 110). Further, the memory system 100 can prepare (i.e., find and read in advance) other data associated with the first read data even though the host 102 does not transmit any other read command to the memory system 110. The host 102 can process the first read data corresponding to the first read command RD_CMD and transmit a second read command RD_CMD requesting second read data to the memory system 110 (during operation margin $C_1$ of the host 102). When the memory system 110 has prepared the second read data, i.e., the second read data could be found in the other data prepared by the memory system 110 without any other read command, the memory system 110 can transmit the second read data to the host 102 immediately after the second read command RD_CMD is input. That is, the host's operation margin $C_1$ for processing the first read data could be overlapped with the memory system's operation margin $S_2$ for finding and reading the second read data. The memory system 110 might not spend time for finding and reading the second read data after the second read command RD_CMD is input, when the second read data has been prepared before the second read command RD_CMD is input (i.e., through the readahead operation).

In the case (W/Readahead Op.) when the memory system 110 supports the readahead operation (Readahead Op.), the memory system 110 can transmit read data to the host 102 in response to a read command RD_CMD input from the host 102 without a delay for finding and reading the read data from the storage device. Thus, the host 102 could process plural read data without a delay time or a waiting time between the second operation margins $C_1$, $C_2$, $C_3$, $C_4$ of the host 102. Accordingly, the first operating margins $S_1$, $S_2$, $S_3$, $S_4$ of the memory system 110 for finding and reading read data in the memory system 110 could be hidden. Data I/O performance of the data processing system could be improved when the readahead operation (Readahead Op.) is supported by the memory system 110.

Moreover, to reduce or avoid a delay in a data processing operation due to a data input/output operation, the host 102 might transmit to the memory system 110 read commands RD_CMD regarding data that might not be needed. In this case, the data processing system could lead to unnecessary consumption of resources. In addition, to reduce or avoid a delay in a data processing operation due to a data input/output operation, reducing the first operation margins $S_1$, $S_2$, $S_3$, $S_4$ for finding and reading read data in the memory system 110 might be difficult because the memory system 100 includes limited available resources.

According to an embodiment, to enhance and increase efficiency of the readahead operation, the memory system 110 may determine a correlation between data and control the data based on the correlation. When the memory system 110 has prepared data in a buffer through a readahead operation but the host 102 does not request read data among readahead data, it might seem that the memory system 110 just wastes resources for an internal operation. Accordingly, the memory system 110 can estimate a pattern regarding at least one read command RD_CMD or a pattern of read data corresponding to the at least one read command RD_CMD.

When a size of a buffer having a fast data input/output speed in the memory system 110 is sufficient, a large amount of data stored in the first non-volatile memory area 172 and the second non-volatile memory area 174 could be read in advance and stored in the buffer. The memory system 110 can find read data requested by the host 102 among the large amount of data stored in the buffer and requests, to transmit the read data to the host 102. However, there is a limitation of resources in the memory system 110, a pattern of data requested by the host 102 may be various, and a size of data requested by the host 102 may also be various. Accordingly, it might be not a great solution for improving efficiency of the data I/O performance that the memory system 110 reads in advance a large amount of data stored in the first non-volatile memory region 172 and the second non-volatile memory region 174 to transmit read data to the host 102.

According to an embodiment, to enhance or improve efficiency and performance of a readahead operation the memory system 110 can perform a readahead operation to obtain data from the first non-volatile memory region 172 and the second non-volatile memory region 174, check a time from temporarily storing the data to outputting stored data to the host 102 in response to a read request of the host 102, and determine a data attribute of the data obtained through the readahead operation. After determining the data attribute of the readahead data, the memory system 110 may determine whether it is effective to store the readahead data in either the first non-volatile memory region 172 or the second non-volatile memory region 174. Herein, the first non-volatile memory region 172 and the second non-volatile memory region 174 have a different data input/output speed.

For example, the memory system 110 can be configured to determine a coverage rate of the readahead data based on a first time point of temporarily storing the readahead data in an internal buffer via the readahead operation associated with read data requested by the host 102 and a second time point of receiving a read command RD_CMD, which is input from the host 102, regarding the readahead data stored in the internal buffer. When the second time point at which the host 102 requests data is later than the first time point at which the memory system 110 obtains the data in advance via the readahead operation, the memory system 110 can determine that it is not necessary to store the data in the first non-volatile memory region 172 having a faster data input/output speed. This might indicate that, even if that data is stored in the second non-volatile memory region 174 having a slower data input/output speed, the memory system 110 can determine that an operation margin for obtaining the data into the internal buffer might be sufficiently secured before the second time point when the host 102 requests the corresponding data.

Conversely, when the second time point at which the host 102 requests the data is closer than the first time point at which the memory system 110 obtains the data in advance, or the second time point is earlier than the first time point, the memory system 110 can store the data in the first non-volatile memory region 172 having a faster data input/output speed. In this case, the faster the memory system 110 reads in advance into the internal buffer, the faster the memory system 110 can output the data in response to the request of the host 102.

According to an embodiment, the memory system 110 may determine where to store data in a plurality of buffers according to a size of the data. Here, the size of the data may be associated with a size of the read data RD_DATA that is sequentially or continuously read and output in response to read command(s) RD_CMD, or a size of readahead data which is a target of the readahead operation associated with the read data RD_DATA. For example, the memory system 110 can use the size of the data as a reference for estimating a pattern in which the host 102 uses the read data RD_CMD. If it is estimated that the amount of sequential read data to be subsequently read is larger than a predetermined threshold based on a start address of data in the read command transmitted by the host 102, an operation margin to process the corresponding data in the host 102 may also become greater, and it might be estimated that efficiency of preparing the data in advance through the readahead operation is not great. In this case, the memory system 110 may store the data in the second non-volatile memory area 174 having a slower data input/output speed. For example, when it is estimated that an amount of data requested by the host 102 is larger than a threshold based on a pattern (e.g., sequential read or random read) of read commands RD_CMD input from the host 102, the memory system 110 can determine that an operation margin for preparing the data in advance through the readahead operation is sufficient, and store the data in the second non-volatile memory region 174 having a slower data input/output speed.

Conversely, when it is estimated that an amount of requested data is not larger than the threshold based on the pattern of the read commands RD_CMD input from the host 102, the memory system 110 can determine that obtaining the data in advance is advantageous to improve data I/O performance. In this case, the memory system 110 may store the data in the first non-volatile memory region 172 having a faster data input/output speed.

As described above, the memory system 110 may include plural memory regions 172, 174 having a different data input/output speed. The plural memory regions 172, 174 may be implemented in various forms in the memory device 150 (refer to FIGS. 2 to 3) for storing data in the memory system 110. The memory system 110 performs the readahead operation (Readahead Op.) to obtain readahead data. The memory system 110 can determine a data attribute of the readahead data, based on a difference between a first time point at which the readahead data is obtained and stored in a buffer through the readahead operation and a second time point at which the memory system 110 outputs the readahead data to the host 102 in response to a read request input from the host 102, or a size of data which is estimated to be requested by the host 102. Further, the memory system 110 can determine where to store the data among the plural memory regions 172, 174 based on the data attribute of the readahead data. If it is determined that the readahead data is required to be output at a faster rate, the memory system 110 can store the readahead data in the first non-volatile memory region 172 which can operate at a faster data input/output speed among the plural memory regions. Conversely, if it is determined that the readahead data is not required for fast input/output, the readahead data may be stored in the second non-volatile memory region 174 having a slower data input/output speed among the plural memory regions.

Hereinafter, descriptions will be made focusing on operations or components that can be technically distinguished between the controller 130 and the memory device 150 described in FIG. 1 and FIGS. 2 to 4. Specifically, a flash translation layer (FTL) 240 in the controller 130 will be described in more detail with reference to FIGS. 3 to 4. According to an embodiment, roles and functions of the flash translation layer (FTL) in the controller 130 may be varied.

Figure 2:
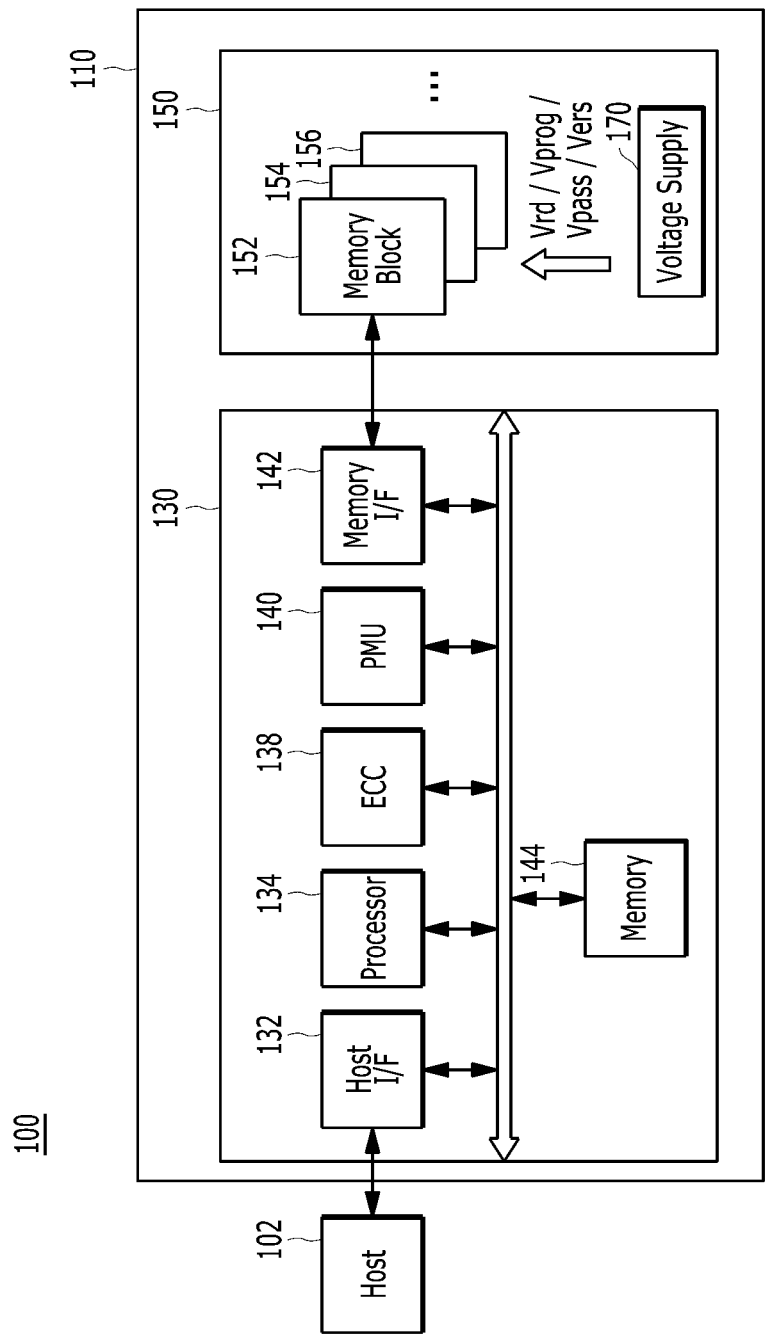
FIG. 2 illustrates a data processing system according to another embodiment of the present disclosure.
Figure 3:
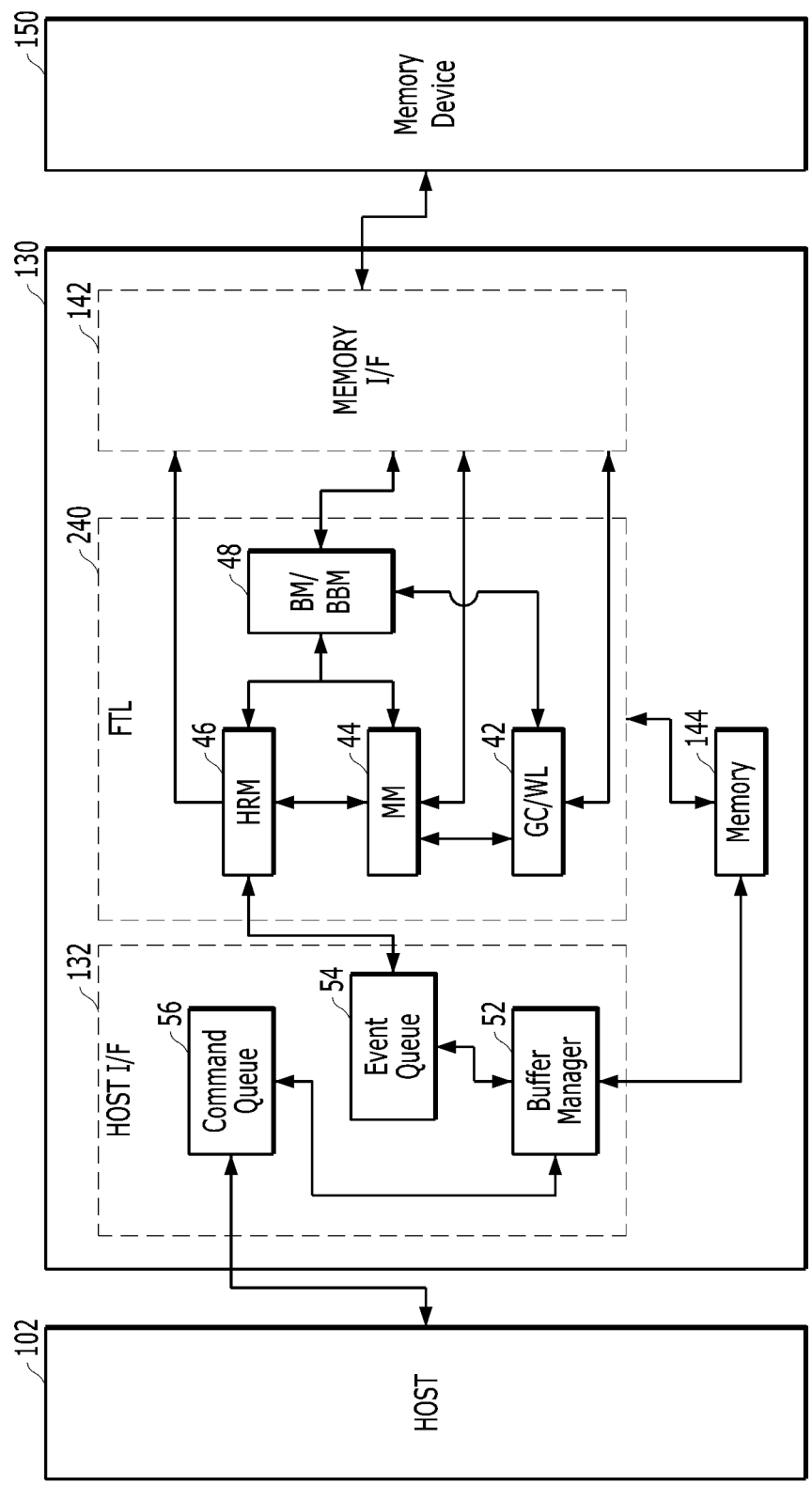
FIG. 3 illustrates a memory system according to another embodiment of the present disclosure.

FIGS. 2 and 3 illustrate some operations that may be performed by the memory system 110 according to one or more embodiments of the present disclosure.

Referring to FIG. 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

As shown in FIG. 2, the memory device 150 may include a plurality of memory blocks 152, 154, 156. The memory block 152, 154, 156 may be understood as a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered to be a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood to be a set of components implemented on a physically distinguishable substrate. Each memory die may be connected to the controller 130 through a data path. Each memory die may include an interface to exchange an item of data and a signal with the controller 130.

According to an embodiment, the memory device 150 may include at least one memory block 152, 154, 156, at least one memory plane, or at least one memory die. The internal configuration of the memory device 150 shown in FIGS. 1 and 2 may be different according to performance of the memory system 110. An embodiment of the present disclosure is not limited to the internal configuration shown in FIG. 2.

Referring to FIG. 2, the memory device 150 may include a voltage supply circuit 170 capable of supplying at least some voltage into the memory block 152, 154, 156. The voltage supply circuit 170 may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block 152, 154, 156, the voltage supply circuit 170 may supply the read voltage Vrd into a selected non-volatile memory cell. During the program operation for storing data in the non-volatile memory cell included in the memory block 152, 154, 156, the voltage supply circuit 170 may supply the program voltage Vprog into a selected non-volatile memory cell. Also, during a read operation or a program operation performed on the selected nonvolatile memory cell, the voltage supply circuit 170 may supply a pass voltage Vpass into a non-selected nonvolatile memory cell. During the erasing operation for erasing data stored in the non-volatile memory cell included in the memory block 152, 154, 156, the voltage supply circuit 170 may supply the erase voltage Vers into the memory block.

The memory device 150 may store information regarding various voltages which are supplied to the memory block 152, 154, 156 based on which operation is performed. For example, when a non-volatile memory cell in the memory block 152, 154, 156 can store multi-bit data, plural levels of the read voltage Vrd for recognizing or reading the multi-bit data item may be required. The memory device 150 may include a table including information corresponding to plural levels of the read voltage Vrd, corresponding to the multi-bit data item. For example, the table can include bias values stored in a register, each bias value corresponding to a specific level of the read voltage Vrd. The number of bias values for the read voltage Vrd that is used for a read operation may be limited to a preset range. Also, the bias values can be quantized.

The host 102 may include a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command input from the host 102. For example, the controller 130 may perform a read operation to provide data read from the memory device 150 to the host 102 and may perform a write operation (or a program operation) to store data input from the host 102 in the memory device 150. In order to perform data input/output (I/O) operations, the controller 130 may control and manage internal operations of reading data, programming data, erasing data, or the like.

According to an embodiment, the controller 130 may include a host interface 132, a processor 134, error correction circuitry (ECC) 138, a power management unit (PMU) 140, a memory interface 142, and a memory 144. Components included in the controller 130 as illustrated in FIG. 2 may vary according to structures, functions, operation performance, or the like, regarding the memory system 110.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components may be added to or omitted from the controller 130 according to implementation of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102 via a bus. For example, the host 102 and the memory system 110 may use a predetermined set of rules or procedures for data communication or a preset interface to transmit and receive data therebetween. Examples of sets of rules or procedures for data communication or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host interface 132 is a type of layer for exchanging data with the host 102 and is implemented with, or driven by, firmware called a host interface layer (HIL). According to an embodiment, the host interface 132 can include a command queue.

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., x1, x4, x8, or x16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal (e.g., a correction success signal or a correction fail signal), based on a result of the error correction decoding. The error correction circuitry 138 may use a parity bit, which has been generated during the ECC encoding process for the data stored in the memory device 150, in order to correct the error bits of the read data. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above described codes. The error correction circuitry 138 shown in FIG. 2 can include at least some of the components included in the controller 130 shown in FIG. 1.

For example, the ECC decoder may perform hard decision decoding or soft decision decoding on data transmitted from the memory device 150. The hard decision decoding can be understood as one of two methods broadly classified for error correction. The hard decision decoding may include an operation of correcting an error bit by reading digital data of '0' or '1' from a non-volatile memory cell in the memory device 150. Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values (e.g., multiple bit data, approximate values, an analog value, and the like) in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use a low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes can be understood as probabilistic decoding. The hard decision decoding in which a value output from a non-volatile memory cell is coded as 0 or 1. Compared to the hard decision decoding, the soft decision decoding can determine the value stored in the non-volatile memory cell based on the stochastic information. Regarding bit-flipping which may be considered an error that can occur in the memory device 150, the soft decision decoding may provide improved probability of correcting the error and recovering data, as well as providing reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) for the soft decision decoding. The LDPC-CCs may have a scheme using a linear time encoding and a pipeline decoding based on a variable block length and a shift register.

According to an embodiment, the ECC decoder may use, for example, a Log Likelihood Ratio Turbo Code (LLR-TC) for the soft decision decoding. A Log Likelihood Ratio (LLR) may be calculated as a non-linear function for a distance between a sampled value and an ideal value. In addition, a Turbo Code (TC) may include a simple code (for example, a Hamming code) in two or three dimensions and repeat decoding in a row direction and a column direction to improve reliability of values.

The power management unit (PMU) 140 may control electrical power provided to the controller 130. The PMU 140 may monitor the electrical power supplied to the memory system 110 (e.g., a voltage supplied to the controller 130) and provide the electrical power to components included in the controller 130. The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150. The memory interface 142 can include the execution queue 180 or the plurality of group queues 182, 184, 186 shown in FIG. 1.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data of operations performed in the memory system 110 and the controller 130. For example, the memory 144 may temporarily store read data output from the memory device 150 in response to a read request from the host 102 before the read data is output to the host 102. In addition, the controller 130 may temporarily store write data input from the host 102 in the memory 144 before programming the write data in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144. For example, the memory 144 can include the data buffer 164 shown in FIG. 1.

In addition to the read data or write data, the memory 144 may store information (e.g., map data, read requests, program requests, etc.) used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like.

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. As a background operation that is performed without a command transmitted from the host 102, the controller 130 can perform garbage collection (GC), wear leveling (WL), bad block management for identifying and processing bad blocks, or the like.

According an embodiment, substantially similar operations may be performed as both the foreground operation and the background operation. For example, when the memory system 110 performs garbage collection in response to a request or a command input from the host 102 (e.g., Manual GC), the garbage collection can be considered a foreground operation. When the memory system 110 performs garbage collection independently of the host 102 (e.g., Auto GC), the garbage collection can be considered a background operation.

When the memory device 150 includes a plurality of dies (or a plurality of chips) each including a plurality of non-volatile memory cells, the controller 130 may perform parallel processing regarding plural requests or commands input from the host 102 in order to improve performance of the memory system 110. For example, the transmitted requests or commands may be divided into plural groups including at least some of a plurality of planes, a plurality of dies, or a plurality of chips included in the memory device 150, and the plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes. Such a processing method or scheme can be considered as an interleaving method. Because a data input/output speed of the memory system 110 increases by operating with the interleaving method, data I/O performance of the memory system 110 can be improved.

By way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150. The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together.

In one embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156. A configuration of the memory device 150 may be changed depending on performance of the memory system 110.

FIG. 2 illustrates the memory device 150 that includes the plurality of memory blocks 152, 154, and 156. The plurality of memory blocks 152, 154, and 156 may be any of single-level cell (SLC) memory blocks, multi-level cell (MLC) memory blocks, or the like, according to the number of bits that can be stored in one memory cell. An SLC memory block includes a plurality of pages implemented by memory cells, each memory cell storing one bit of data. An SLC memory block may have higher data I/O operation performance and higher durability than the MLC memory block. The MLC memory block includes a plurality of pages implemented by memory cells, each memory cell storing multi-bit data (e.g., two or more bits of data). The MLC memory block may have larger storage capacity for the same space compared to the SLC memory block. The MLC memory block can be highly integrated in a view of storage capacity.

In an embodiment, the memory device 150 may be implemented with MLC memory blocks such as a double level cell (DLC) memory block, a triple-level cell (TLC) memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can be implemented with a block including a plurality of pages implemented by memory cells, each memory cell capable of storing five or more bits of data.

According to an embodiment, the controller 130 may use a MLC memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For an MLC overwrite operation, the controller 130 may store the number of program times as separate operation information when 1-bit data is programmed in an MLC. According to an embodiment, an operation for uniformly levelling threshold voltages of the MLCs may be carried out before another 1-bit data is programmed in the same MLCs, each having stored another-bit data.

In an embodiment, the memory device 150 is embodied as a non-volatile memory such as a flash memory, for example, as a NAND flash memory, a NOR flash memory, or the like. In another embodiment, the memory device 150 may be implemented by at least one of a phase change random access memory (PCRAM), a ferroelectrics random access memory (FRAM), a spin transfer torque random access memory (SU-RAM), and a spin transfer torque magnetic random access memory (STT-MRAM), or the like.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in or associated with the controller 130.

The host interface 132 may handle commands, data, and the like transmitted from the host 102. By way of example but not limitation, the host interface 132 may include a command queue 56, a buffer manager 52, and an event queue 54. The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52. For example, the host interface 132 can include the direct memory access (DMA) control circuitry 162 shown in FIG. 1.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a command for reading data, i.e., a read command, and a command for programming/writing data, i.e., a write command, may be alternately transmitted to the memory system 110. The host interface 132 may sequentially store commands, data, and the like, which are transmitted from the host 102, in the command queue 56. Thereafter, the host interface 132 may estimate or predict what type of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events input to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using multi-thread included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In one embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In one embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data stored in the selected block to an empty block and erase data stored in the selected block so that the memory device 150 may have enough free blocks (i.e., empty blocks with no data). When the block manager 48 provides information regarding a block to be erased to the state manager 42, the state manager 42 may check all flash pages of the block to be erased to determine whether each page of the block is valid.

For example, to determine validity of each page, the state manager 42 may identify a logical address recorded in an out-of-band (OOB) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (HRM) 46 or the state manager 42. The map manager 44 may store the entire map table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant map table stored in the memory device 150. When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (HRM) 46 may program the latest version of the data for the same logical address of the page and currently issue an update request. When the state manager 42 requests the map update in a state in which the copying of the valid page(s) is not completed normally, the map manager 44 might not perform the map table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
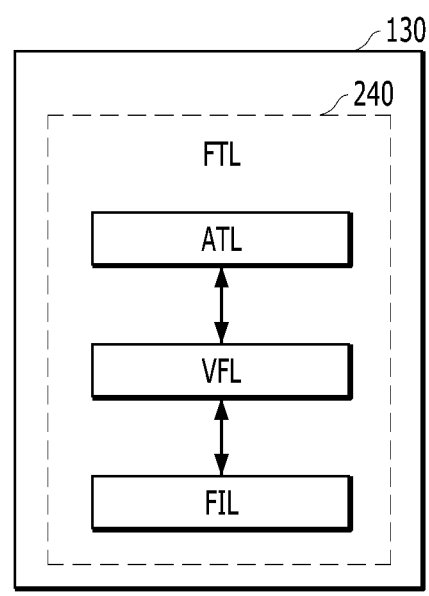
FIG. 4 illustrates internal configuration included in a controller shown in FIGS. 1 to 3 according to embodiments of the present disclosure.

FIG. 4 illustrates internal configuration of the controller shown in FIGS. 1 to 3 according to an embodiment of the present disclosure.

Referring to FIG. 4, the flash translation layer (FTL) 240 in the controller 130 can be divided into three layers: an address translation layer ATL; a virtual flash layer VFL; and a flash Interface Layer FIL.

For example, the address translation layer ATL may convert a logical address LA transmitted from a file system into a logical page address. The address translation layer ATL can perform an address translation process regarding a logical address space. That is, the address translation layer ATL can perform an address translation process based on mapping information to which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, into a virtual page address VPA. Here, the virtual page address VPA may correspond to a physical address of a virtual memory device. That is, the virtual page address VPA may correspond to the memory block 60 in the memory device 150. If there is a bad block among the memory blocks 60 in the memory device 150, the bad block may be excluded by the virtual flash layer VFL. In addition, the virtual flash layer VFL can include a recovery algorithm for scanning a scan area to restore the logical-to-virtual address mapping information (L2V mapping) stored in the memory device 150 and mapping information in the data region for storing user data. The recovery algorithm can be capable of recovering the logical-to-virtual address mapping information (L2V mapping). The virtual flash layer VFL may perform an address conversion process regarding the virtual address space, based on the logical-to-virtual address mapping information (L2V mapping) restored through the recovery algorithm.

The flash interface layer FIL can convert a virtual page address of the virtual flash layer VFL into a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
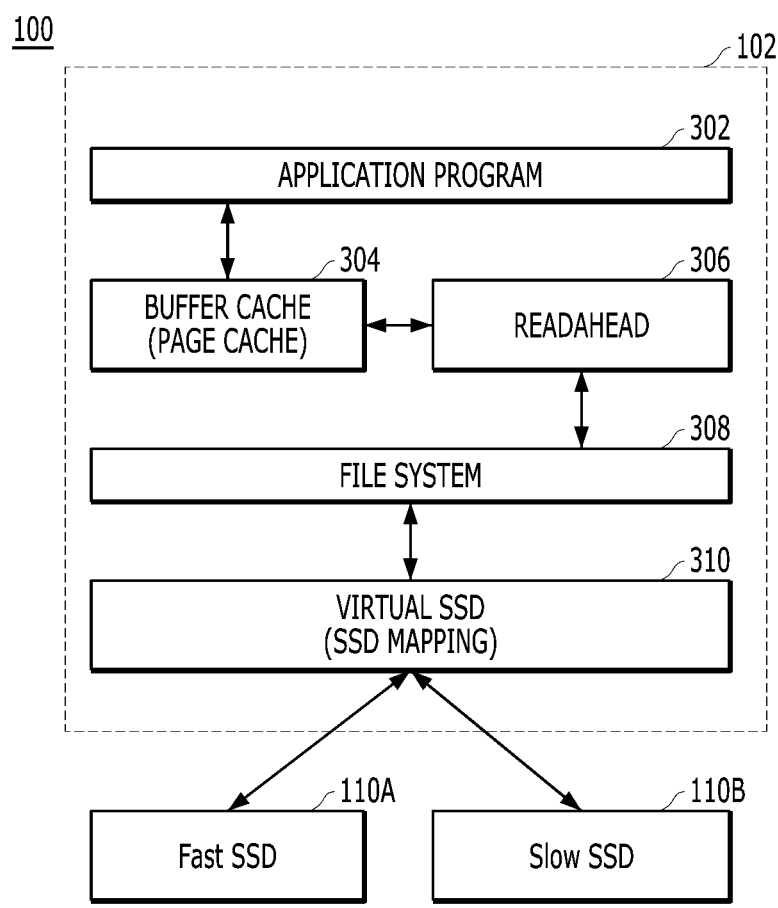
FIG. 5 illustrates a first example of the data processing system supporting a readahead operation according to an embodiment of the present disclosure.

FIG. 5 illustrates a first example of the data processing system supporting a readahead operation according to an embodiment of the present disclosure.

Referring to FIG. 5, the data processing system 100 may include a host 102 and a plurality of memory systems 110A, 110B. The host 102 can secure data stored in the plurality of memory systems 110A and 110B through a readahead operation. The plurality of memory systems 110A, 110B may have different input/output performance.

The application program 302 in the host 102 can generate a read command for securing data stored in the plurality of memory systems 110A, 110B. A buffer cache (page cache) 304 in the host 102 can temporarily store data generated by the application program 302 or temporarily store data requested by the application program 302. For example, when the application program 302 generates a read command, the read command is transmitted to one among the plurality of memory systems 110A, 110B. One among the plurality of memory systems 110A, 110B can receive the corresponding read command. When one among the plurality of memory systems 110A, 110B outputs data corresponding to the read command to the host 102, the host 102 can store the data in the buffer cache 304. The application program 302 can use the corresponding data stored in the buffer cache 304. During this procedure, the application program 302 may wait for the data corresponding to the read command without performing an additional operation. This may deteriorate data input/output performance of the data processing system 100.

To improve the data input/output performance of the data processing system 110, readahead control circuitry 306 in the host 102 can perform a readahead operation to obtain data in advance, which is not requested but could be requested soon by the application program 302 from the plurality of memory systems 110A, 110B, and store the obtained data in the buffer cache 304.

A file system 308 and a virtual file system 310 in the host 102 can associate data generated by the application program 302 to an address system used by the host 102 and a storage space included in the plurality of memory systems 110A, 110B. Herein, a file is a set or a group of information such as a program or data. For example, a file is a 'consecutive concatenation of bytes.' Because the file does not have a specific structure and information/data is continuously connected in units of bytes, a start and an offset of the file could be specified with an address of byte unit. On the other hand, a space for storing data or information may be described as a disk. A disk can store data in units of fixed blocks, and input and output of all disks can be made in units of sectors. Generally, a block can have a size of 512 bites. Data or information may be configured in units of bytes, but the disk may store data in units of blocks rather than bytes. Thus, the file system 308 may perform a connection and matching operation between files and blocks of the disk.

The data storage space included in the plurality of memory systems 110A, 110B may support data read or program operation in units of pages, but data erase operation may be performed in units of memory blocks. The virtual file system 310 may establish, manage, and control a connection relationship between the file system 308 and the plurality of memory systems 110A, 110B.

The readahead control circuitry 306 in the host 102 can perform a readahead operation for obtaining in advance data stored in the plurality of memory systems 110A, 110B and store the read-ahead data in the buffer cache 304. The readahead operation performed by the read-ahead control circuitry 306 can be performed with a different speed based on whether the readahead data is stored in the first memory system 110A having a faster data input/output speed or the second memory system 110B having a slower data input/output speed among the plurality of memory systems 110A, 110B. Therefore, when a speed at which the application program 302 processes data (i.e., a speed at which data is taken from the buffer cache 304) is fast, the readahead control circuitry 306 needs to secure or obtain the readahead data at a faster speed. If data is stored in the first memory system 110A, the readahead operation could be performed faster. On the other hand, when the speed at which the application program 302 processes data is not fast, the readahead control circuitry 306 has a sufficient operation margin for the readahead operation so that the readahead data could be easily secured. Such data might be stored in the second memory system 110B.

According to an embodiment, when the host 102 interworks with the plurality of memory systems 110A, 110B having a different data input/output speed, the readahead control circuitry 306 in the host 102 can track the readahead data and determine a data attribute of the readahead data. Based on the data attribute, the file system 308 and the virtual file system 310 can determine which one of the first memory system 110A and the second memory system 110B the readahead data is stored in. For example, the file system 308 and the virtual file system 310 can relocate the readahead data from the first memory system 110A to the second memory system 110B or vice versa.

Figure 6:
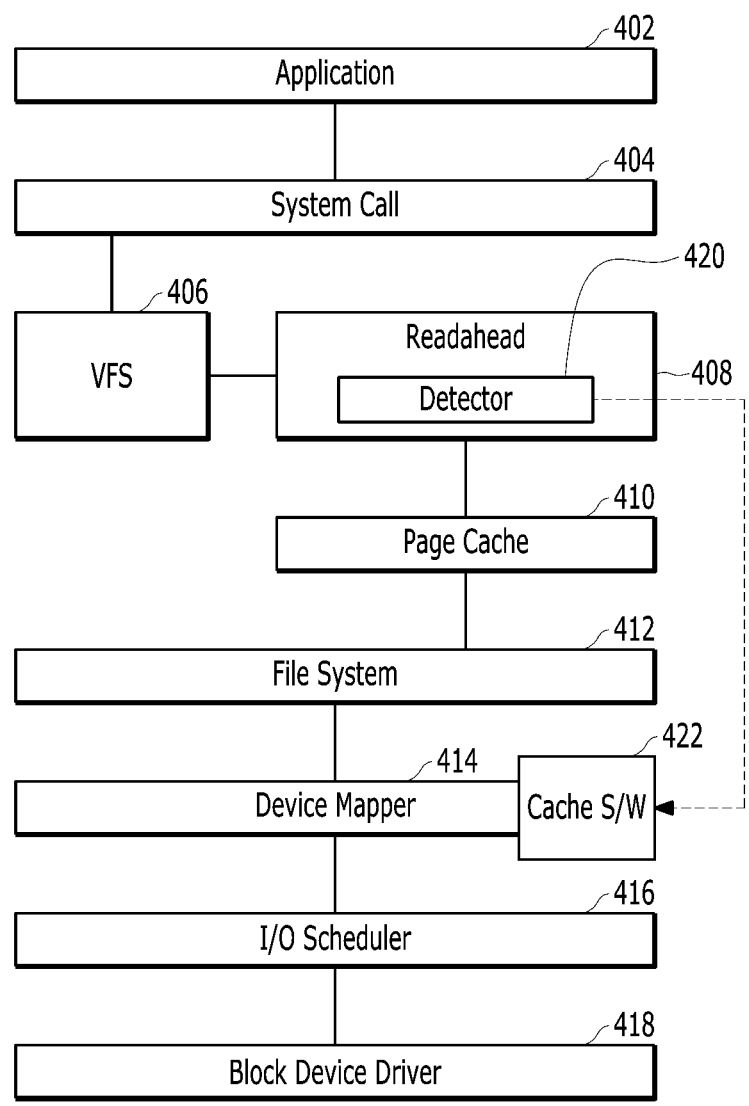
FIG. 6 illustrates a first example of a host in the data processing system according to an embodiment of the present disclosure.

FIG. 6 illustrates a first example of a host in the data processing system according to an embodiment of the present disclosure. Specifically, FIG. 6 describes an example in which the host 102 includes a Linux kernel structure.

Referring to FIG. 6, the host 102 can include an application program 402 configured to generate a read command for data, a virtual file system manager 406 configured to control a virtual file system (VFS), a readahead control circuitry 408 configured to perform a readahead operation to obtain data stored in a memory system in conjunction with the virtual file system (VFS), a page cache memory 410 configured to temporarily store readahead data, a file system 412 configured to check a location of read data requested by the application program 402 and generate related information, a device mapper 414 configured to map a physical address identified by the file system 412 to a higher-level virtual block device, an input/output scheduler 416 configured to determine or change a sequence or an order of data input/output operations and allocate resources to the data input/output operations, and a block device driver 418 configured to perform data communication with the memory system for the data input/output operations. Herein, a virtual block device could be considered an interface with applications that appears to the applications as a memory device, such as a standard block device. The virtual block device interacts with additional elements to do data deduplication to files at the block level such that one or more files accessed using the virtual block device have at least one block which is shared by the one or more files.

The application program 402 in the host 102 may generate a read command RD_CMD transmitted to the memory system 110. A system call control circuitry 404 can generate a call or an event corresponding to the read command RD_CMD. The call or the event can be understood as a signaling scheme in which a plurality of functions or modules communicate with each other in the host 102.

The virtual file system manager 306 in the host 102 provides a common file model so that various types of file systems can be used universally. The host 102 may use at least one of various file systems according to a manufacturer or an operating system (OS). For example, when the host 102 includes Microsoft's Windows as an operating system, a Microsoft file system such as MS-DOS, VFAT, or NTFS may be used. If the host 102 includes Apple's operating system, a file system such as Apple Macintosh (HFS) may be used. Although the file system used by the host 102 may be various, the virtual file system manager 306 can provide the common file model. Accordingly, when converted through a Virtual File System (VFS), data storage and output in a storage space such as a memory system can be unified whatever file system the host 102 uses.

According to an embodiment, the file system 412 shown in FIG. 6 can correspond to the file system 308 described with reference to FIG. 5.

The device mapper 414 can form a basis of a logical volume manager (LVM), a software-based Redundant Array of Inexpensive or Independent Disk (RAID), disk encryption, and the like. Further, the device mapper 414 can perform additional functions such as a file system snapshot. Herein, RAID can be used to create and use multiple physical disks as one logical disk to reduce cost and improve reliability and include independently available storage devices that can be used to protect data and improve disk performance. The software-based RAID can support management and control of storage space with an operating system, program, and the like in the host 102.

The host 102 supporting the readahead operation can include the readahead control circuitry 408. The readahead control circuitry 408 may select readahead data based on a virtual file system (VFS). The readahead control circuitry 408 can store the readahead data in the page cache memory 410. Herein, the page cache memory 410 can be a memory area used to improve data input/output (I/O) performance by reducing access to a storage space such as a memory system through a virtual flash layer (VFL). The readahead control circuitry 408 can store the file read once in the page cache memory 410. When access to the same data (e.g., a read command) occurs through the system call control circuitry 404, the data may be read and delivered from the page cache memory 410 instead of reading the corresponding data from the storage space of the memory system, or the like.

When the application program 402 of the host 102 generates a read command for an offset of a specific file, the readahead control circuitry 408 can first check whether data corresponding to the read command is stored in the page cache memory 410. There are two cases. When the corresponding data is cached in the page cache memory 410, it is a page cache hit. When the corresponding data is not cached, it is a page cache fault. In the two cases, a subsequent processing of the read command can be different.

First, in a case of the page cache hit, data stored in the page cache memory 410 can be transmitted to the application program 402 of the host 102 in response to the read command RD_CMD of the host 102. The read operation corresponding to the read command RD_CMD may be quickly terminated, or the read operation might be not performed within the memory system 110. Conversely, in a case of the page cache fault, the readahead control circuitry 408 can generate a structure (e.g., a bio structure, a request structure, or etc.) for reading data based on file level information corresponding to the read command RD_CMD. For example, the bio (Block I/O) structure is a structure that groups several blocks into a segment for data processing, which can be considered as a basic unit of data input/output (TO). The bio structure can include information regarding the block device driver 418 that performs the data I/O and information regarding a memory region storing data associated with the data I/O. The readahead control circuitry 408 may request, through the bio (Block I/O) structure, input/output operation for data stored in a storage space such as a memory system. Data transferred from a storage space such as a memory system may be stored in the page cache memory 410. When the readahead control circuitry 408 outputs data corresponding to the read command RD_CMD from the page cache memory 410, the read operation may be finished.

Readahead detection circuitry 420 may calculate a time difference between the reception of the read command RD_CMD transmitted by the application program 402 of the host 102 and the completion of the readahead operation. Through this, the readahead detection circuitry 420 may calculate or estimate how much time a data input/output operation is reduced through the readahead operation based on whether readahead is hit or missed. The readahead detection circuitry 420 can determine a coverage rate based on the time difference between the reception of the read command RD_CMD and the completion of the readahead operation or a reduced time caused by the readahead operation. For example, the smaller the time difference, the lower the coverage rate. The greater the time difference, the higher the coverage rate.

According to an embodiment, the readahead detection circuitry 420 may calculate a size of data corresponding to the read command RD_CMD.

Based on values calculated by the readahead detection circuitry 420, a cache memory controller 422 may determine a start time of the readahead operation, a size of data secured or obtained through the readahead operation, and the like. Based on the values calculated by the readahead detection circuitry 420, a priority of the readahead data can be determined. When it is determined that the data needs to be output to the application program 402 in the host 102 more quickly, the readahead control circuitry 408 can determine that the readahead data is stored in a storage device or a storage space having a faster data input/output speed. On the other hand, when it is determined that the data does not need to be output to the application program 402 in the host 102 more quickly, the readahead control circuitry 408 can determine that the readahead data is stored in a storage device or a storage space having a slower data input/output speed.

According to an embodiment, the readahead detection circuitry 420 can calculate a coverage rate of the readahead data, so that the readahead data may be stored in a first cache memory capable of performing a faster operation when a coverage rate of the readahead data is lower. Conversely, when the coverage rate calculated by the readahead detection circuitry 420 increases, the readahead data may be stored in a second cache memory having a low data input/output performance.

Figure 7:
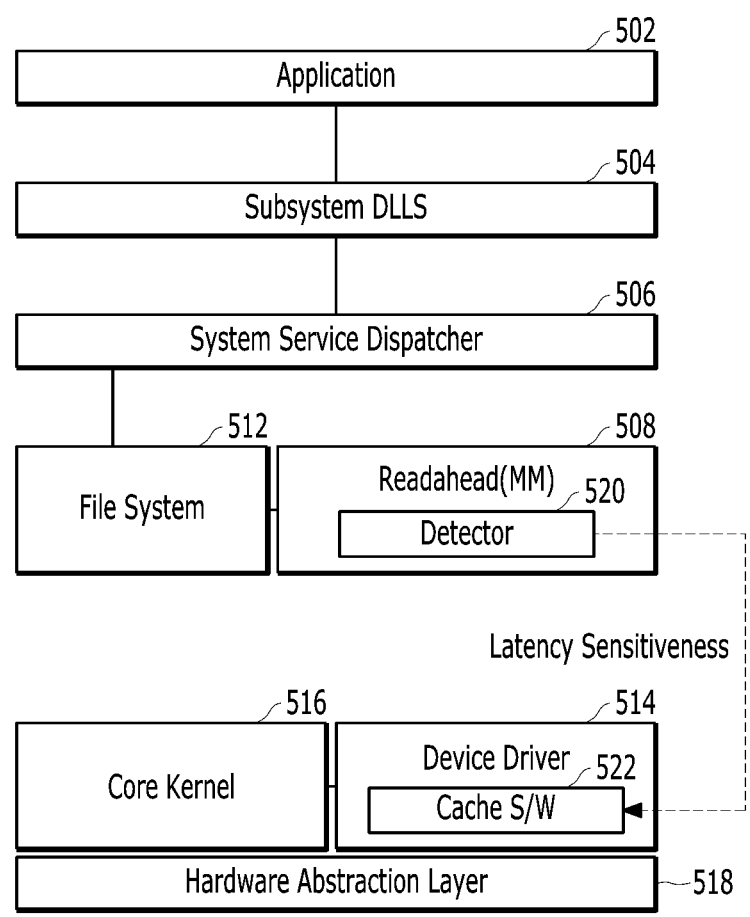
FIG. 7 illustrates a second example of the host in the data processing system according to an embodiment of the present disclosure.

FIG. 7 illustrates a second example of the host in the data processing system according to an embodiment of the present disclosure. Specifically, FIG. 7 illustrates an example in which the host 102 includes a window-based structure.

Referring to FIG. 7, an application program 502 in the host 102 may generate a read command for obtaining data. For the security and compatibility of the operating system in the host 102, the application program 502 might be blocked to directly call a kernel system resource. Instead of the application program 502, the subsystem (or system DLL) 504 can support making a kernel call for the application program 502. In response to the kernel call generated by the subsystem 504, allocation of system resources may be determined through a system service dispatcher 506. For example, the system service dispatcher 506 can include a scheduler. The system service dispatcher 506 may allocate system resources to be used in response to a call of the subsystem 504. For example, the system service dispatcher 506 can allocate system resources based on usage efficiency of system support, throughput, return time, waiting time, response time, and the like.

A file system 512 included in the host 102 may correspond to the file system 308 described in FIG. 3 and the file system 412 described in FIG. 4. Readahead control circuitry 508 may correspond to the reada head control circuitry 408 described with reference to FIG. 6. A readahead detection circuitry 520 may correspond to the readahead detection circuitry 420 described with reference to FIG. 6.

A core kernel 516 included in the host 102 may provide system resources requested by the application program 502 while the application program 502 is executed. The core kernel 516 can efficiently manage limited system resources including hardware in the host 102 to carry out processes performed by the application program 502. The core kernel 516 may support security, resource management, and the like.

A Hardware Abstraction Layer (HAL) 518 in the host 102 serves as a bridge between physical hardware included in the host 102 and software running on the host 102, such as an operating system (OS). The hardware included in the host 102 and peripheral devices such as the memory system 110 which is engaged with the host 102 can be implemented in various forms. Designing or implementing software such as an operating system (OS) for various types of hardware might not be efficient. Accordingly, the hardware abstraction layer 518 can establish an abstracted structure so that the software can recognize and use various types and structures of hardware regardless of physical differences between types and structures of hardware. By using the abstract structure set by the hardware abstraction layer 518, the software might not need to differently access the hardware and the peripheral devices based on individual characteristics of the hardware and the peripheral devices.

A device driver 514 in the host 102 can correspond to the device mapper 414, the input/output scheduler 416, and the block device driver 418 described with reference to FIG. 4. The readahead detection circuitry 520 may determine a data attribute of the readahead data obtained through the readahead operation and transmit the data attribute of the readahead attribute to a cache memory controller 522. Here, the data attribute of the readahead data can be determined by a coverage rate or latency sensitivity. The cache memory controller 522 can determine a location in a storage device, i.e., where the device driver 514 could store the readahead data, in response to the data attribute of the reada head data. Here, the storage device can include a plurality of memory regions or a plurality of memory systems having different data input/output performance.

Figure 8:
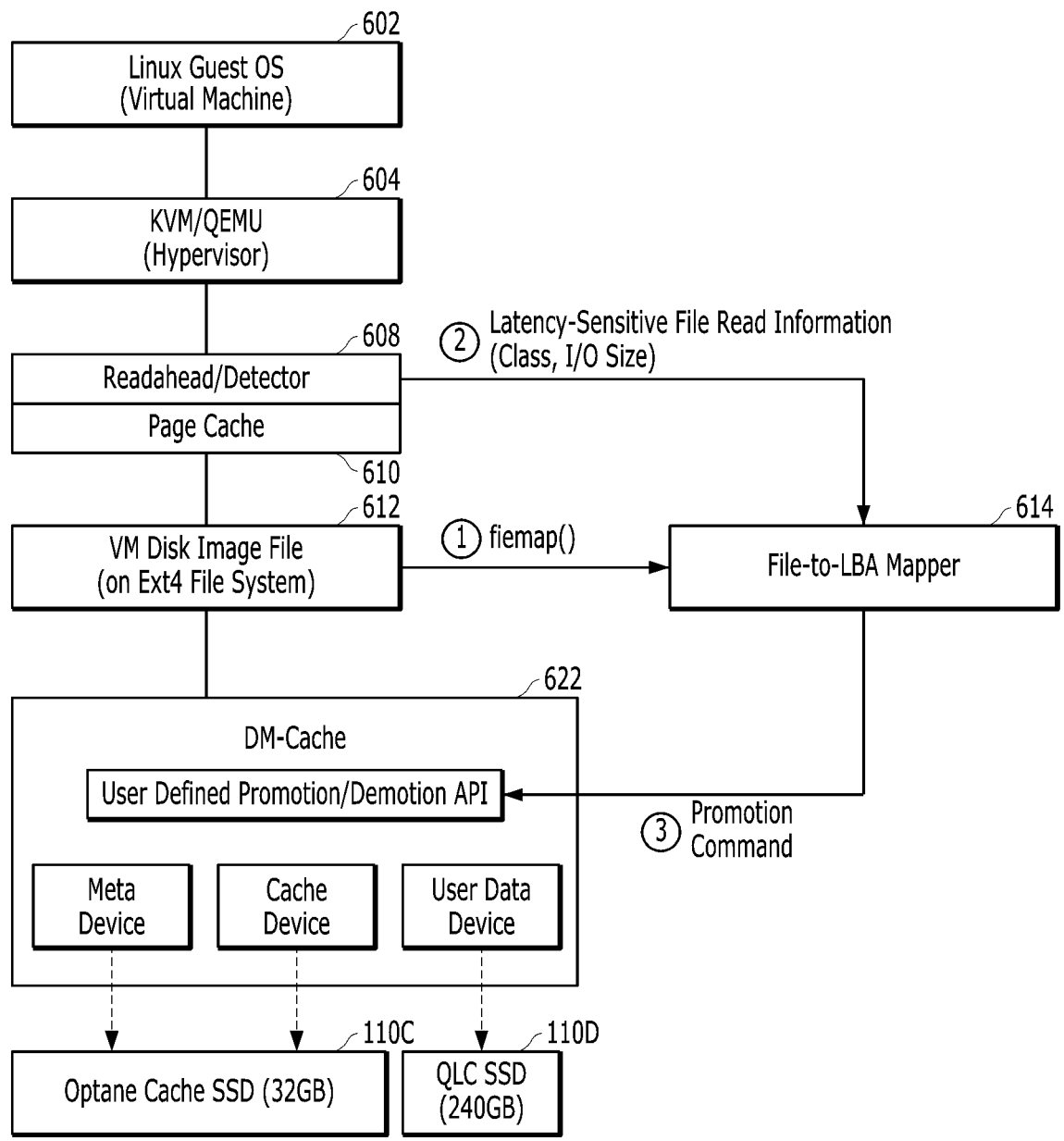
FIG. 8 illustrates a third example of the host in the data processing system according to an embodiment of the present disclosure.

FIG. 8 illustrates a third example of the host in the data processing system according to an embodiment of the present disclosure.

Referring to FIG. 8, the host 102 may simultaneously operate a plurality of operating systems in a single computing device based on virtualization technology. The host 102 may include an operating system (OS) as well as a guest operating system (Guest OS) 602 which is software installed on a partitioned disk or a virtual machine that is used for another operating system different from the operating system (OS) contained in the host 102.

The host 102 can include a hypervisor 604. The hypervisor 604 may be understood as software capable of scheduling a plurality of operating systems (OSs) on a single computing device (physical machine). The hypervisor 604 may be largely divided into two types. One is a native type that can be operated only through the hypervisor 604 without an operating system installed in a computing device, and the other is a hosted type in which the hypervisor 604 is executed over an operating system installed in the computing device. It is a hosted type. Examples of the hosted type hypervisor 604 include emulation-based QEMU and simulation-based KVM. Emulation means providing hardware and architecture that do not exist in the host 102 as a service to the virtual machine. Simulation means providing a service to a virtual machine based on hardware and architecture existing in the host 102.

According to an embodiment, the host 102 may include a readahead control circuitry 608 and a page cache memory 610. The readahead control circuitry 608 can correspond to the readahead control circuitry 306 described in FIG. 5, the readahead control circuitry 408 described in FIG. 6, or the readahead control circuitry 508 described in FIG. 7. The readahead control circuitry 608 can include a readahead detection circuitry. The page cache memory 610 may correspond to the page cache memory 410 described with reference to FIG. 6 or the page cache memory 610 described with reference to FIG. 8.

The host 102 can include a virtual disk image file manager 612. The virtual disk image file manager 612 can correspond to the file system 412 described with reference to FIG. 6 and the file system 512 described with reference to FIG. 7. According to an embodiment, the virtual disk image file manager 612 can use an extended file system (version 4), which is an improved version of Linux journaling file systems.

The host 102 may include a file-to-logical address mapping manager 614. When the virtual disk image file manager 612 receives a request (filemap, ①), which is for mapping a file, which is a continuous concatenation of bytes, to a logical address (LBA), from the file manager 612, the file-logical address mapping manager 614 can map the file to a logical address (LBA). The readahead control circuitry 508 may collect read information about a file based on the logical address (LBA) assigned by the file-logical address mapping manager 614. Here, the read information can include a size of file or data, a readahead attribute (a data attribute of the readahead data), and the like. For example, the size of data (I/O size) may be determined based on how many logical addresses are successively mapped according to a size of the file. If the readahead attribute corresponding to the coverage rate is determined by calculating the coverage rate after the corresponding data is obtained through the readahead operation, the readahead attribute can be assigned to the logical address associated with the readahead data. The readahead control circuitry 508 may determine a readahead attribute of the readahead data and may check a previously determined readahead attribute of the readahead data.

The host 102 may include a cache memory manager 622. The cache memory manager 622 may retrieve read data corresponding to a read command from storage spaces 110C, 110D, the read command handled by the virtual disk image file manager 612 and the file-logical address mapping manager 614. The file-logical address mapping manager 614 can transmit a request (promotion command, ③) for obtaining data in advance from the storage spaces 110C, 110D to the cache memory manager 622 according to the readahead attribute. The cache memory manager 622 can obtain data from the storage spaces 110C, 110D in response to the request transmitted from the file-logical address mapping manager 614 and store the read data in a cache memory.

The cache memory manager 622 may support multi-level cache hierarchies. In response to the request forwarded from the file-logical address mapping manager 614, the cache memory manager 622 can support demotion and promotion. The demotion is an operation for performing exclusive caching in the multi-level cache layer to mitigate duplicate replication of the same data at multiple levels. The promotion is an operation for performing exclusive caching in the multi-level cache layer to use an adaptive probabilistic filtering technology to reduce overheads of demotion. Demotion and promotion supported by the cache memory manager 622 can be adjusted or changed to increase efficiency of the readahead operation.

The host 102 may interwork with a plurality of memory systems 110C, 110D having different data input/output speeds. The third memory system 110C among the plurality of memory systems 110C and 110D can include an Optane memory. According to an embodiment, the Optane memory may include both a volatile memory and a non-volatile memory. The Optane memory may have a slower data input/output speed than that of a cache memory but a faster data input/output speed than the fourth memory system 110D. The cache memory manager 622 may store metadata information, caching information, and the like in the third memory system 110C having a faster data input/output speed. On the other hand, the cache memory manager 622 may store user data in the fourth memory system 110D having a slower data input/output speed than the third memory system 110C. According to an embodiment, the host 102 may determine whether to store the corresponding data in a location having a faster or slower data input/output speed among the plurality of memory systems 110C, 110D according to a type of data.

Figure 9:
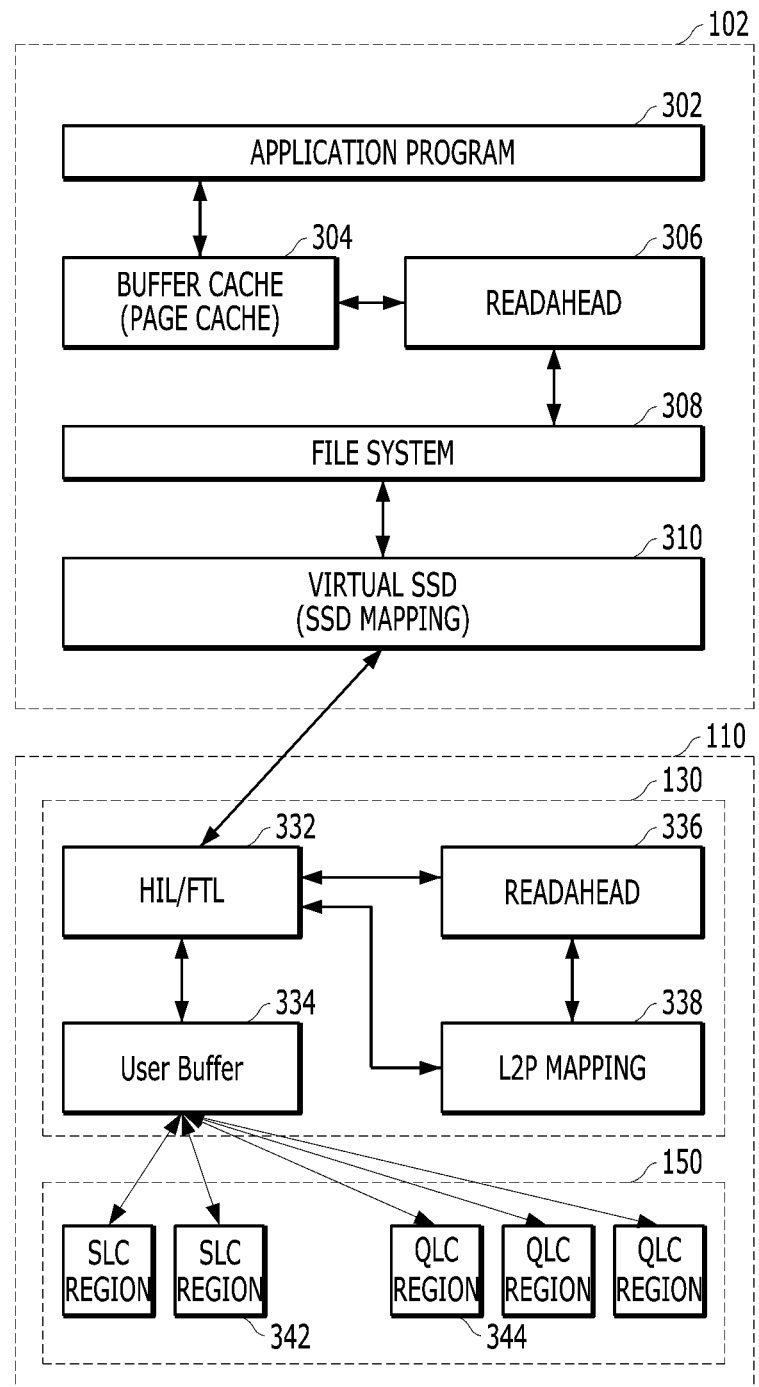
FIG. 9 illustrates a second example of the data processing system supporting the readahead operation according to an embodiment of the present disclosure.

FIG. 9 illustrates a second example of the data processing system supporting the readahead operation. In an embodiment shown in FIG. 5, the host 102 in the data processing system 100 can perform the readahead operation. But, in an embodiment described in FIG. 9, both the host 102 and the memory system 110 of the data processing system 110 can perform the readahead operation individually.

Referring to FIG. 9, the data processing system 100 can include a host 102 and a memory system 110. The host 102 may obtain data stored in the memory system 110 through a readahead operation. Further, the memory system 110 can also perform another readahead operation in response to a request from the host 102.

The memory system 110 may include a memory device 150 including a plurality of non-volatile memory cells and a controller 130 capable of controlling data input/output operations performed in the memory device 150 and performing a read-ahead operation to obtain data in advance from the memory device 150. The memory device 150 can include a plurality of storage regions 342, 344 having different data input/output performance. A first storage region 342 among the plurality of storage regions 342, 344 may include a single-level cell block (SLC) capable of storing one-bit data in a single non-volatile memory cell included therein. Among the plurality of storage regions 342, 344, the second storage region 344 may include a multi-level cell block (MLC) capable of storing multi-bit data in a single non-volatile memory cell included therein. As an example of the multi-level cell block (MLC), there is a quadruple-level cell block (QLC) that stores 4-bit data in a single non-volatile memory cell included therein.

The application program 302 in the host 102 can generate a read command for securing data stored in the memory system 110. The buffer cache (page cache) 304 in the host 102 may temporarily store data generated by the application program 302 or temporarily store data requested by the application program 302. For example, after the application program 302 generates a read command, the read command can be transmitted to the memory system 110. When the memory system 110 transmits data corresponding to the read command to the host 102, the host 102 can store transmitted data in the buffer cache 304. The application program 302 may use the data stored in the buffer cache 304. During this procedure, if the application program 302 does not perform another operation and waits for the data corresponding to the read command, this may deteriorate data input/output performance of the data processing system 100.

To improve the data input/output performance of the data processing system 110, the readahead control circuitry 306 in the host 102 can perform the readahead operation for obtaining data in advance to store the data in the buffer cache 304. Here, the readahead data might not be requested but estimated to be requested soon by the application program 302, which can be determined based on the data corresponding to the read command generated by the application program 302.

The file system 308 and the virtual file system 310 in the host 102 can associate data generated by the application program 302 to an address system used by the host, as well as a location of data storage space included in the memory system 110.

The memory system 110 may receive a read command from the host 102. The controller 130 in the memory system 110 may include a host interface and a flash translation layer 332. The host interface and flash translation layer 332 may correspond to the host interface 132 and the flash translation layer 240 described with reference to FIGS. 2 to 4.

The readahead control circuitry 336 in the controller 130 can read in advance data stored in the memory device 150 and store readahead data in the buffer 334, in response to a read command transmitted from the host 102. The host 102 can perform a readahead operation in response to a read command generated by the application program 302, so that the host 102 can transmit a read command for data to be secured through the readahead operation to the memory system 110. Because the host 102 and the memory system 110 can perform readahead operation individually, readahead data obtained by the readahead control circuitry 306 included in the host 102 and readahead data obtained by the readahead control circuitry 336 included in the memory system 110 may be the same or different. However, if the host 102 and the memory system 100 perform readahead operations based on read requests or read commands generated by the same application program 302, the readahead data obtained by the readahead control circuitry 306 and the readahead control circuitry 336 might be more likely to be identical. When the memory system 110 does not perform the readahead operation, the readahead operation of the host 102 might be delayed due to the time required for internal operations of the memory system 110 until data corresponding to the read command transmitted from the host is output. Based on the read command transmitted from the host 102 and the logical address corresponding to the read command, mapping circuitry 338 can transmit information about data belonging to the readahead operation from the memory device 150 to the readahead control circuitry 336. The readahead control circuitry 336 can perform a readahead operation based on the information transmitted from the mapping circuitry 338.

On the other hand, the readahead control circuitry 336 can determine the coverage rate for the readahead data based on a first time point at which the readahead data stored in the memory device 150 is obtained in advance and stored in the buffer 334 through the readahead operation and a second time point at which the readahead data is transmitted to the host 102. The readahead control circuitry 336 can relocate or change a storage location of the readahead data when the data input/output command is not transmitted from the host 102 (e.g., in an idle state) according to the coverage rate. For example, data requiring faster data input/output can be stored in the first storage region 342 among the plurality of storage regions 342, 344. Data which does not need faster data input/output can be stored in the second storage region 344 among the plurality of storage regions 342, 344.

Figure 10:
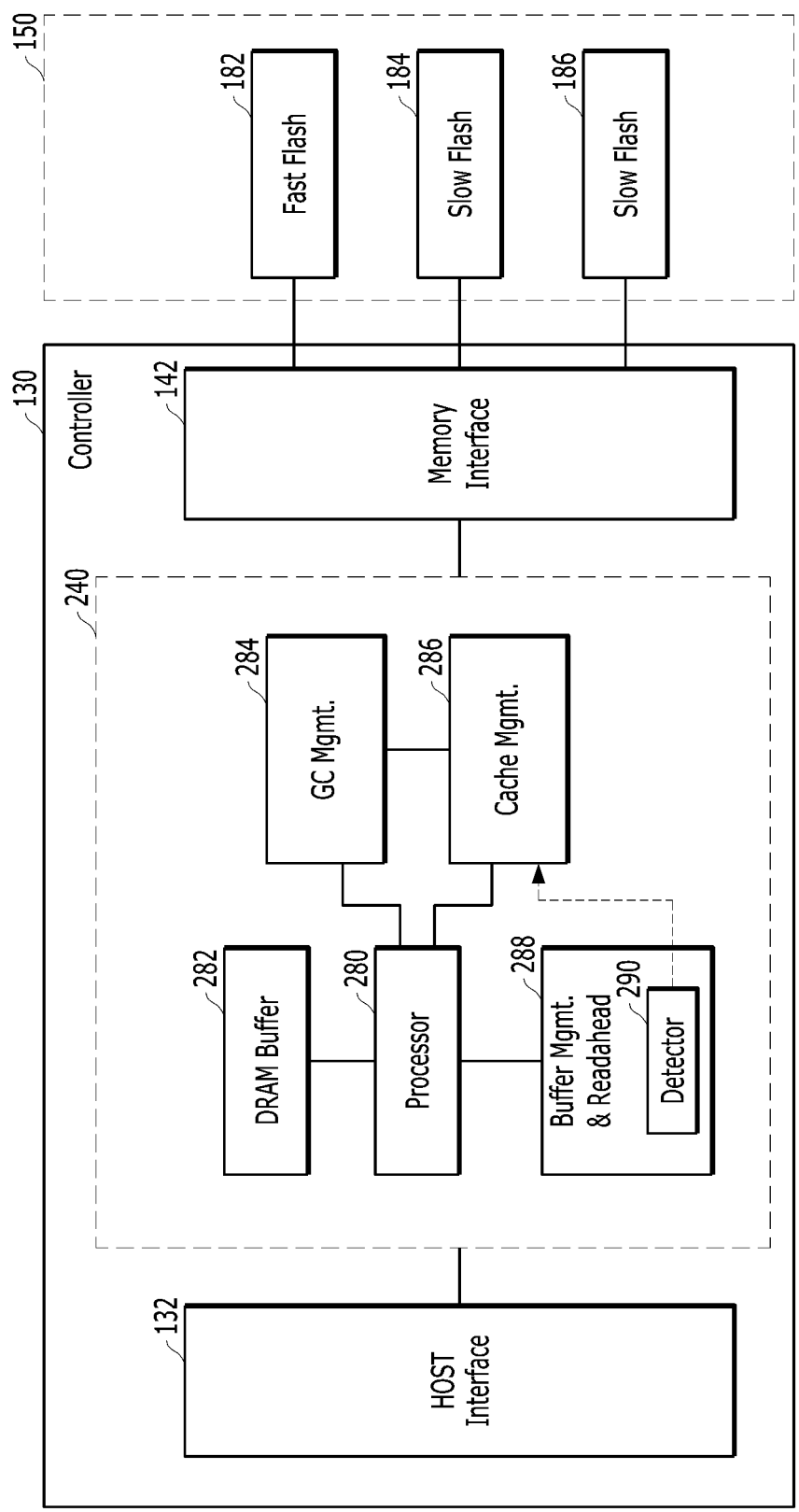
FIG. 10 illustrates an example of a memory system supporting the readahead function according to an embodiment of the present disclosure.

FIG. 10 illustrates an example of a memory system supporting the readahead function according to an embodiment of the present disclosure.

Referring to FIG. 10, the memory system can include a controller 130 and a memory device 150. The controller 130 can include a host interface 132, a flash translation layer 240, and a memory interface 142. The memory device 150 can include a plurality of memory regions 182, 184, 186 having a different data input/output speed. Among the plurality of memory regions 182, 184, 186, a first memory region 182 may have a higher data input/output speed than second and third memory regions 184, 186.

The host interface 132 and the memory interface 142 in the controller 130 can correspond to the host interface 132 and the memory interface 142 described with reference to FIGS. 2 to 3.

The flash translation layer 240 within the controller 130 may include a processor 280, a data buffer 282, a garbage collection manager 284, a cache memory manager 286, and a buffer management and readahead controller 288. The buffer management and readahead controller 288 can include, or be associated with, the readahead detection circuitry 290. The processor 280 may correspond to the processor 134 described with reference to FIG. 2. Also, the data buffer 282 can be an area established in the memory 144 described with reference to FIG. 2.

The garbage collection manager 284 may perform garbage collection on memory blocks included in the plurality of memory regions 182, 184, 186 in the memory device 150. When relocating valid data stored in the memory block to a new free block, the garbage collection manager 284 can reflect the readahead attribute determined by the buffer management and read-ahead controller 288 and can transfer the valid data to one of the plurality of memory regions 182, 184, 186 based on the readahead attribute.

The buffer management and read-ahead controller 288 may evict data stored in the data buffer 282 or store data, obtained in advance from the memory device 150, in the data buffer 282. The buffer management and read-ahead controller 288 may read in advance data stored in the memory device 150 (without reception of a read command corresponding to the data) and store the data in the data buffer 282. The readahead detection circuitry 290 in the buffer management and read-ahead control unit 288 can recognize the first time point at which the corresponding data is read in advance. When the buffer management and read-ahead controller 288 outputs data stored in the data buffer 282 in response to a request from the host 102, the corresponding data may be evicted. The readahead detection circuitry 290 in the buffer management and read-ahead control unit 288 can recognize the second time point at which the corresponding data is transmitted to the host 102.

The readahead detection circuitry 290 included in the buffer management and readahead controller 288 can determine the coverage rate based on the first time point and the second time point. The readahead detection circuitry 290 can determine a readahead attribute of the readahead data based on the coverage rate. The cache memory manager 286 can modify or maintain metadata or the readahead attribute of the readahead data based on the coverage rate. When metadata for the corresponding data is modified by the cache memory manager 286, the garbage collection manager 284 can determine which memory region the corresponding data is stored in based on the readahead attribute.

Figure 11:
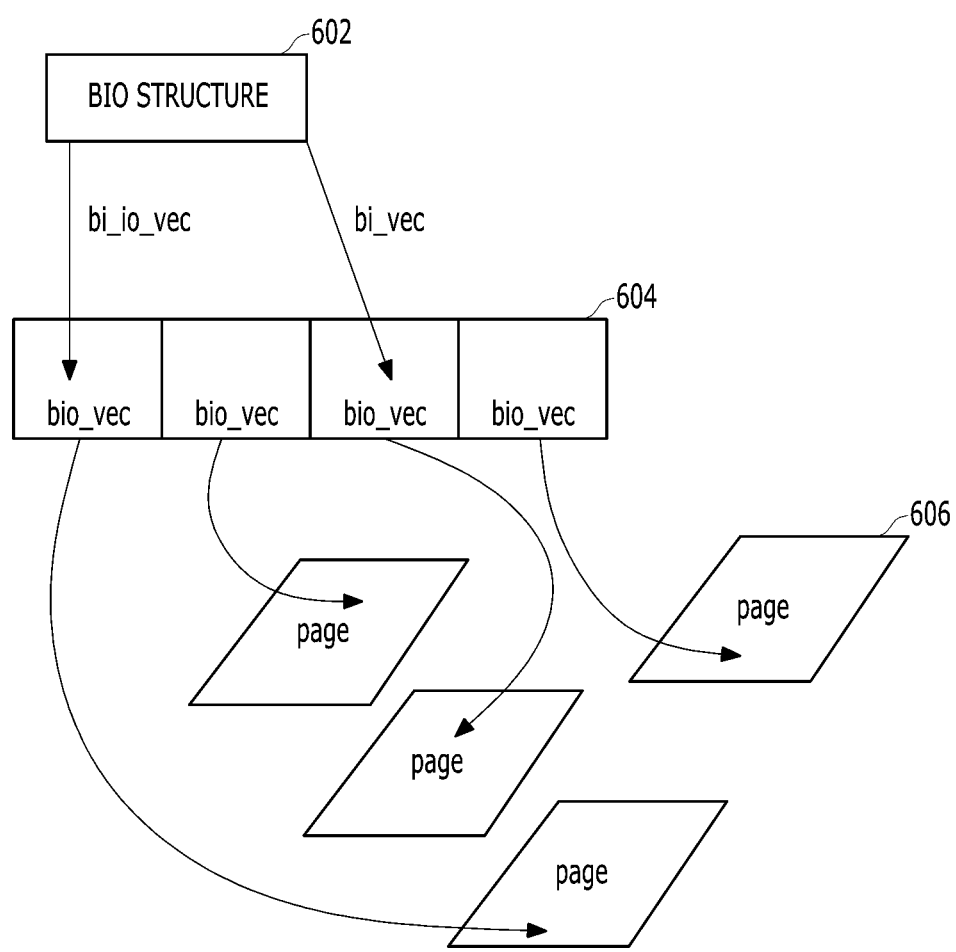
FIG. 11 illustrates a data structure applicable to a virtual file system according to an embodiment of the present disclosure.

FIG. 11 illustrates a data structure applicable to a virtual file system according to an embodiment of the present disclosure. Various types of data structures can be set in a virtual file system (VFS) used by the memory system 110. As an example, in FIG. 11, a bio structure 602 that can be used for data input/output in a block device will be described. Herein, the block device could be considered a data storage device that supports reading and (optionally) writing data in fixed-size blocks, sectors, or clusters.

A minimum unit for accessing data stored in the memory system 110 can be defined as a sector, which may be determined according to the configuration of the memory device 150. Typically, a sector may have a size of 512 bytes. When the memory device 150 stores a large amount of data, the size of the sector may be increased. In a block unit access supported by the block device driver 418 described in FIG. 6, a block is considered a multiple of a sector. The block can have a different size according to a file system used by the memory system 110. For example, a block may have a size of 512 B, 1 KB, 2 KB, or 4 KB, and each block may consist of continuous sectors.

Typically, a block can be set to be equal to or smaller than the size of a page in the memory device 150. If the size of a block is larger than the size of the page 606, the controller 130 would perform an additional operation to control the data input/output operation. This is because the memory device 150 can support page-based input/output.

A segment may indicate an area for storing data while the controller 130 performs a data input/output (I/O) operation with the memory device 150. For example, the segment may indicate a partial area in the page cache memory 410 described with reference to FIG. 6. One block may be located at the same page in the memory device 150, but a data input/output operation between the controller 130 and the memory device 150 may be performed on plural blocks. Accordingly, a segment may correspond to data stored in a single page or plural pages.

Referring to FIGS. 2 to 3, a data input/output operation between the controller 130 and the memory device 150 can include an operation of transferring data stored in the memory 144 to the memory device 150 (PROGRM), or transferring data stored in the memory device 150 to the memory 144 (READ). When a data input/output operation is performed for plural blocks, data corresponding to the plural blocks may not be stored in consecutive pages (i.e., consecutive positions) in the memory device 150.

Referring to FIG. 11, the controller 130 can generate a bio structure 602 for performing a data input/output operation in block units. For example, in a case of a data input/output operation for a single block, the bio structure 602 may have one bio. However, in the case of a data input/output operation for plural blocks, the bio structure 602 may have a bio array structure bio_vec 604. The bio array structure bio_vec 604 can correspond to different pages 606 in the memory device 150. For example, data corresponding to the bio array structure (bio_vec, 604) may be stored in consecutive positions in the memory device 150 or may be stored in different positions apart from each other.

The bio structure 602 may store a segment using the bio array structure bio_vec 604. A segment may be stored in the form of a page and may include information related thereto. The memory system 110 may input/output data corresponding to a plurality of segments in a single data input/output operation. Therefore, the bio structure 602 can support the data input/output operation through the bio array structure bio_vec 604.

Figure 12:
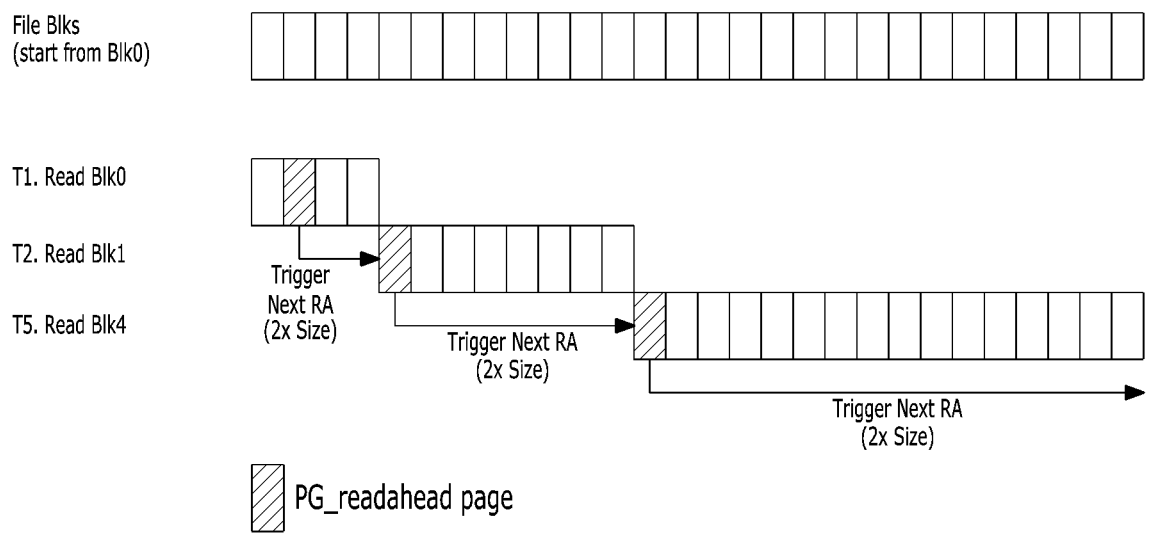
FIG. 12 illustrates a first example of the readahead operation according to an embodiment of the present disclosure.

FIG. 12 illustrates a first example of the readahead operation according to an embodiment of the present disclosure.

Referring to FIG. 12, the data File Blks stored in the memory device 150 can be arranged in block units. In FIG. 12, each block-sized data is shown as a single box (i.e., a block).

For example, the controller 130 would access a first block blk0 to a fourth block blk3 among the data (File Blks) stored in the memory device 150 in response to a read command RD_CMD to be transmitted to the memory device 150. After reading the first block blk0 at the first time point T1 (Read Blk0), the controller 130 can read data from the second block blk1 to the fourth block blk3 and store read data in the page buffer memory included in the buffer 334 shown in FIG. 9. When the data corresponding to the second block Blk1 is output in response to the read command RD_CMD transmitted from an external device, a readahead operation RA can be triggered based on the information included in the second block Blk1 (the second block Blk1 is slash-marked). The second block blk1 can include information regarding the readahead operation for double size data (i.e., eight blocks from the fifth block to twelfth block). The controller 130 can secure the information stored in the second block blk1 at the second time point T2 (Read Blk1) and transmit a readahead command to the memory device 150 based on the information.

After securing data for the fifth block blk4 from the memory device 150 in response to the readahead command, data corresponding to the fifth block blk4 can be output at a time point T5 in response to the read command RD_CMD transmitted from the external device. When the data corresponding to the fifth block blk4 is output to the host 102, another readahead operation RA could be triggered based on trigger information included in the fifth block blk4. The fifth block blk4 may include the trigger information regarding the readahead operation for double size data (i.e., sixteenth blocks from the thirteenth block to the 28th block). For the readahead operation, the controller 130 can transmit the readahead command to the memory device 150.

According to an embodiment, when the controller 130 can find data corresponding to the read command RD_CMD transmitted from the external device in the page buffer memories (or page cache memories) 410, 610 (i.e., a page cache hit), another readahead operation can be performed. In addition, as a page cache hit occurs, a size of readahead data that is obtained through the readahead operation can be doubled. The controller 130 can read data in advance from the memory device 150 to output data secured by the readahead operation to an external device. The controller 130 can sequentially or continuously access and read related data in response to the readahead command and store accessed data in the page buffer memories 410, 510.

Figure 13:
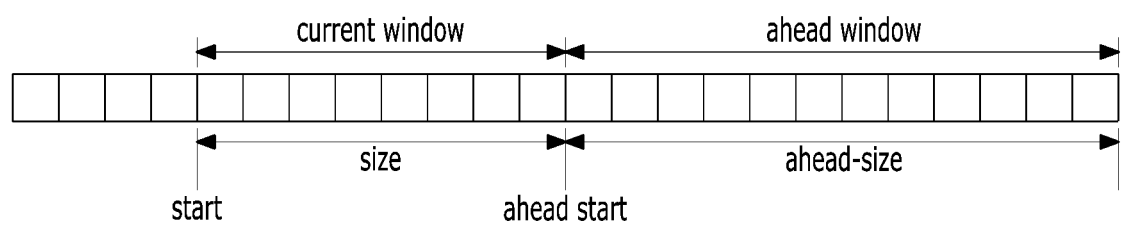
FIG. 13 illustrates a second example of the readahead operation according to an embodiment of the present disclosure.

FIG. 13 illustrates a second example of the readahead operation according to an embodiment of the present disclosure.

Referring to FIG. 13, the memory system 110 can establish and manage two windows (current window, ahead window) to perform pipelining readahead operations. The two windows can be divided into a current window and an ahead window. For example, while a data input/output operation in response to a read command RD_CMD transmitted from the application program 302 of the host 102 can be performed in the current window, the memory system 110 can perform a readahead operation in the ahead window asynchronously. When a window for the data input/output operation in response to the read command RD_CMD is changed from the current window to the ahead window, the ahead window could be considered the current window. Further, the memory system 110 can set a new ahead window, and then another readahead operation can be performed asynchronously in the new ahead window.

Moreover, performance of the readahead operation can be changed depending on when the memory system 110 sets a new ahead window. Referring to FIG. 11, based on a time point when a page cache hit occurs with respect to data corresponding to a specific block, the memory system 110 can set a new ahead window and determine whether to perform a new readahead operation.

Figure 14:
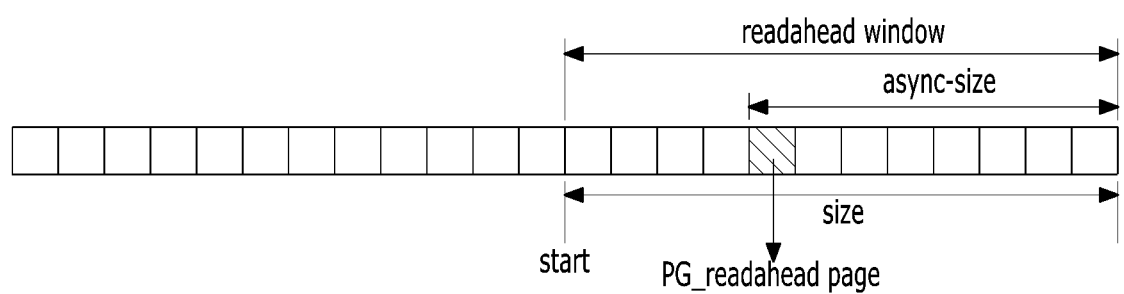
FIG. 14 illustrates a third example of the readahead operation according to an embodiment of the present disclosure.

FIG. 14 illustrates a third example of the readahead operation according to an embodiment of the present disclosure.

Referring to FIG. 14, the memory system 110 may set and manage only one window (readahead window) instead of two windows (current window, ahead window) to perform a read-ahead operation by pipelining. Also, the memory system 110 may set an asynchronous size variable (async_size) for determining a start time or a frequency of the readahead operation performed asynchronously. When the number of pages of readahead data that are not yet consumed (e.g., not used by the host 102) in the page buffer memories 410, 510 falls below a preset threshold, the memory system 110 can perform another readahead operation. This method can support the memory system 110 to perform pipelining readahead operations in a single readahead window only.

Specifically, a trigger or a flag for a next readahead operation can be included in a single window (readahead window). Referring to FIG. 14, the trigger or the flag PG_readahead page can be added at a position (start+size−async_size) obtained by adding a size of data (e.g., number of pages) read in advance from a start position (start) and subtracting the asynchronous size variable (async_size) from the added value. If the memory system 110 outputs data corresponding to a marked page (e.g., with the trigger or the flag) to an external device, the memory system 110 could perform another readahead operation.

Referring to FIGS. 12 to 14, the memory system 110 can establish at least one window for performing the readahead operation or insert a mark, a trigger, or a flag in the at least one window differently. Accordingly, there may be a difference in efficiency and performance of the readahead operation performed by the memory system 110.

Figure 15:
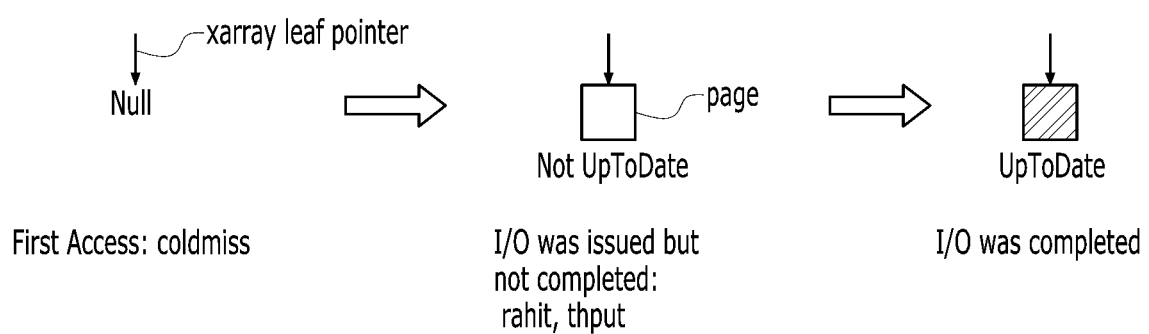
FIG. 15 illustrates a data indicator assigned for the readahead operation according to an embodiment of the present disclosure.

FIG. 15 illustrates a data indicator assigned for the readahead operation according to an embodiment of the present disclosure.

Referring to FIG. 15, the readahead control circuitry 408, 508, 336 can mark or set various states regarding the readahead data. For example, a read command for the readahead data prepared in the page cache memories 410, 510 or the buffer 334 might not occur. In this case, a data indicator for the readahead data in the page cache memories 410, 510 or the buffer 334 may be set to a miss state (Null) indicating that data is not used even though the data has been read in advance. If a read command for the readahead data is generated but the data is not yet completely output in response to the read command, the data indicator for the corresponding data may be set as an output standby state (Not UpToDate). Thereafter, when the data is completely output in response to the read command for the corresponding data, the data for the corresponding data may be set as an output end state (UpToDate).

According to an embodiment, the readahead control circuitry 408, 508, 336 can change a data indicator for the readahead data in the page cache memories 410, 510 or the buffer 334 (state transition). Based on the change of the data indicator, the readahead detection circuitry 420, 520, 290 can calculate the coverage rate regarding the readahead data.

Figure 16:
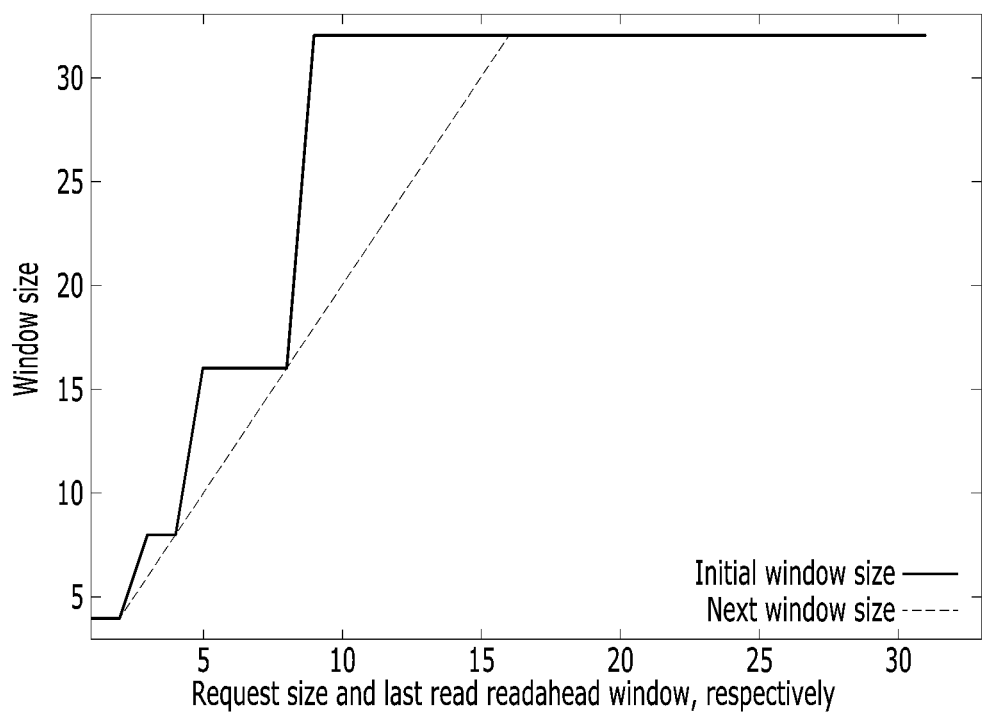
FIG. 16 illustrates a change of window size associated with the readahead operation according to a data cover ratio according to an embodiment of the present disclosure.

FIG. 16 illustrates a change of window size associated with the readahead operation based on a data cover ratio according to an embodiment of the present disclosure.

Referring to FIGS. 12 to 14 and 16, an initial setting for a readahead operation window can be increased by two times (solid line). However, the memory system 110 can determine a priority for the readahead data in response to the coverage rate and store the readahead data in one of a plurality of cache memories according to the priority. Coverage rates of the readahead data might not all be the same. Accordingly, if a location at which the readahead data is stored is changed according to the priority of the readahead data, a size of the readahead data stored in the page cache memories 410, 510 may increase gradually, rather than double (dotted line).

Because internal configuration and resources of the memory system 110 are limited, resources that are allocated for the page cache memories 410, 510 can also be limited. Accordingly, when consumption of internal resources consumed for the readahead operation gradually increases, the memory system 110 could easily utilize or allocate the limited resources for other purposes, so that the performance of the memory system 110 could be improved or enhanced.

Hereinafter, an improvement and an effect of the readahead operation of the memory system 110 will be described with reference to FIGS. 17 and 19.

Figure 17:
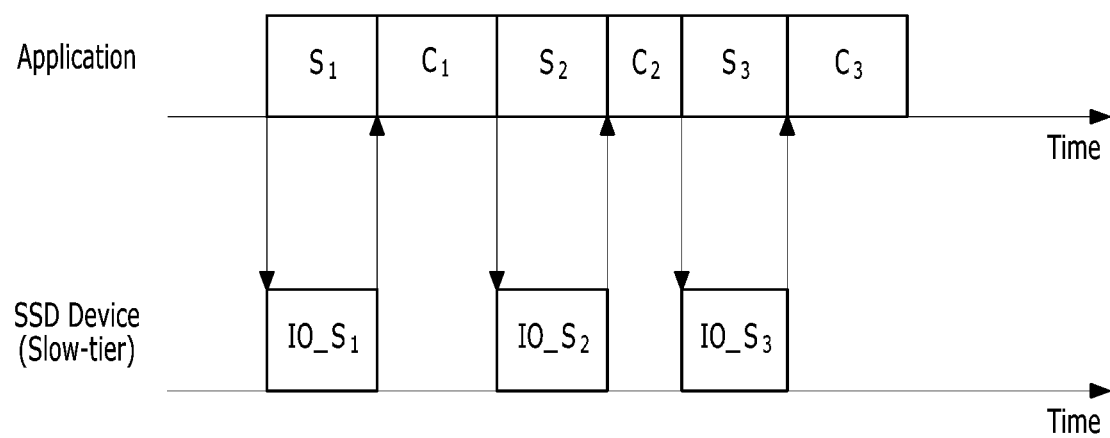
FIG. 17 illustrates a memory system not supporting the readahead operation.

FIG. 17 illustrates a memory system not supporting the readahead operation.

Referring to FIG. 17, in a case when the memory system does not perform a readahead operation, the memory system can read and transmit data in response to a read command. An application program of the host can handle transmitted data after the memory system transmits read data in response to the read command. As described in FIG. 1, the host application program might not continuously process data because of waiting data corresponding to the read command. A processing time $C_1$, $C_2$, $C_3$ of the host application program could be delayed by an operation margin $IO\_S_1$, $IO\_S_2$, $IO\_S_3$ for the memory system to read and transmit the data in response to the read command.

Figure 18:
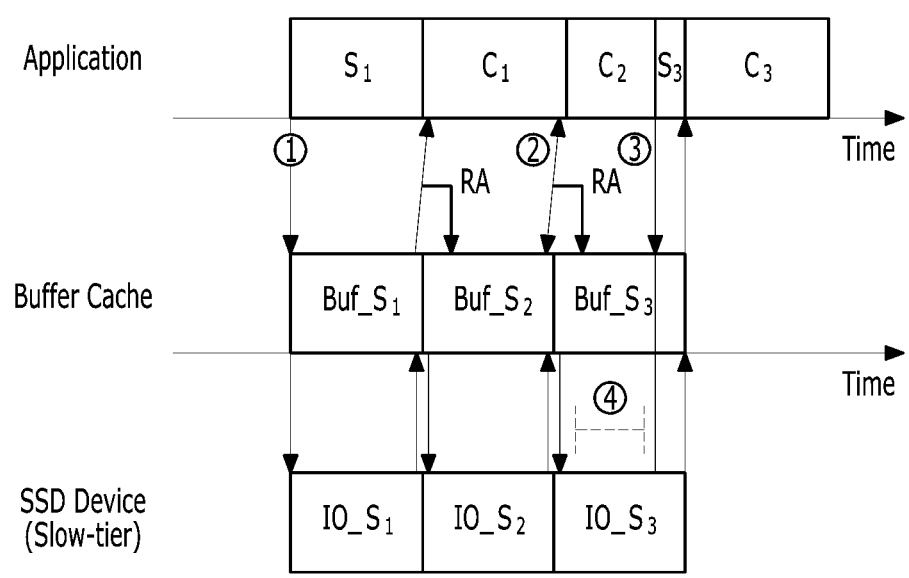
FIG. 18 illustrates a memory system performing the readahead operation on a memory block basis according to an embodiment of the present disclosure.

FIG. 18 illustrates a memory system performing the readahead operation on a block basis according to an embodiment of the present disclosure. Herein, a size of readahead data obtained through the readahead operation could be determined on a block basis, a file basis, or etc. according to an embodiment.

Referring to FIG. 18, the memory system can perform a readahead operation, but the memory system and the data buffer have a slower data input/output performance.

When the application program in the host sends a readahead command RA or the memory system detects a pattern of sequentially accessing data, files, or blocks requested by the application program through the read command, the memory system can perform the readahead operation to obtain data in advance (prepare data). In this way, it is possible to hide the time and the operation margin required for input/output of data in the memory system, so that the operation of the application program can be performed faster because the application program might not wait for obtaining data.

In a case when data is requested first (①), the data does not exist in the page cache memories 410, 510, and the memory system should read the data from the non-volatile memory device ($IO\_S_1$), store the read in the buffer ($Buf\_S_1$), and output the data stored in the buffer to the application program ($S_1$). While these processes are carried out, the memory system can perform a readahead operation RA regarding estimated data which might include second data which could be requested second.

While the application program processes first requested data ($C_1$), the memory system may read the second data from the memory device ($IO\_S_2$) and store the second data in the buffer ($Buf\_S_2$). When the application program requests the second data ((②)), the memory system can output the second data which has been already prepared in the buffer to the application program. In addition, the memory system may perform another readahead operation RA regarding third data which could be requested third. After the application program requests the second data, the application program might not wait for the second data by an operation margin for the I/O operation in the memory system, and the second data could be processed without a significant delay ($C_2$).

For example, the time ($C_2$) for processing the second data by the application program can be faster than that of processing other data. The application program can request the third data and process the third data ((③)) after processing the second data ($C_2$).

For example, the memory system can internally allocate the same resources for the readahead operation so that an operation speed or an operation margin for the readahead operation could be same. When the application program can request the third data ((③)), it might be likely that the readahead operation regarding the third data might be not completed. That is, in the memory system, the operations for reading the third data from the non-volatile memory device ($IO\_S_3$) and storing the third data in the buffer ($Buf\_S_3$) might still be in progress. After the memory system reads the third data in advance, stores the third data in the buffer ($Buf\_S_3$) and outputs the third data to the application program, the application program could process the third data ($C_3$).

In this procedure, with respect to the third data, it may not be possible to completely hide the operation margin for the readahead operation performed inside the memory system. That is, the effect of the readahead operation of the memory system decreases from the point in time ((③)) when the application program requests the third data to the point in time ($C_3$) when the third data is processed. In the case of third data, an operation margin due to the readahead operation can be decreased by a section ((④)) from the time when the readahead operation on the third data is started to the time when the third data is requested.

The readahead detection circuitry 336 described with reference to FIG. 9 can calculate a coverage rate from the first data to the third data. As comparing the above-described processes, e.g., the coverage rates from the first data to the third data are compared, the coverage rate of the second data is the largest. The coverage rate of the third data is smaller than that of the second data but is greater than that of the first data. The coverage rate of the first data may be the lowest. Accordingly, when the third data and the first data are located (or relocated) in a faster data buffer or data cache, the coverage rate of the memory system can be increased. To this end, the memory system 110 can store frequently used and frequently accessed blocks in at least one non-volatile cache region 342.

The memory system 110 can perform a readahead operation and calculate a coverage rate for block-unit data that is a target of the readahead operation. Based on the coverage ratio, the memory system 110 can copy or move block data from the memory device 150 to the at least one non-volatile cache region 342. The at least one non-volatile cache region 342 can have a higher data input/output speed than other regions 344 in the memory device 150.

Figure 19:
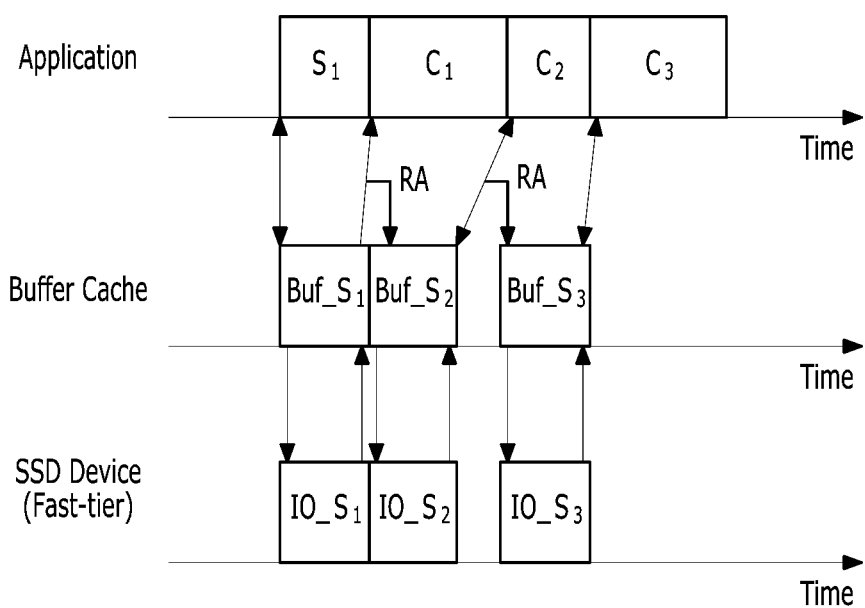
FIG. 19 illustrates a memory system securing data with different priorities through the readahead operation according to an embodiment of the present disclosure.

FIG. 19 illustrates a memory system securing data with different priorities through the readahead operation according to an embodiment of the present disclosure.

Referring to FIG. 19, as described with reference to FIG. 18, the memory system 110 can perform the read-ahead operation for the first to third data and calculate the coverage rates regarding the first to third data. The first to third data could be copied or moved in the memory device 150 having a faster data input/output speed, and the memory device 150 can be associated with a data buffer such as the at least one non-volatile cache region 342 having a faster data input/output speed than another cache area or other regions 344.

When the application program requests the first data, the first data does not exist in the page cache memories 410, 510. The memory system should read the data from the non-volatile memory device ($IO\_S_1$), store the read in the buffer ($Buf\_S_1$), and output the data stored in the buffer to the application program ($S_1$). While these processes are carried out, the memory system can perform a readahead operation RA regarding estimated data which might include second data which could be requested second.

While the application program processes first requested data ($C_1$), the memory system may read the second data from the memory device ($IO\_S_2$) and store the second data in the buffer ($Buf\_S_2$). When the application program requests the second data, the memory system can output the second data which has been already prepared in the buffer to the application program. In addition, the memory system may perform another readahead operation RA regarding third data which could be requested third. After the application program requests the second data, the application program might not wait for the second data by an operation margin for the I/O operation in the memory system, and the second data could be processed without a significant delay ($C_2$).

As in the case described in FIG. 18, the time ($C_2$) for processing the second data by the application program can be faster than that of processing other data. The application program can request the third data and process the third data (③) after processing the second data ($C_2$).

Because the memory system 110 copies or moves the first to third data in the memory device 150 having a faster data input/output speed and outputs the first to third data through the at least one non-volatile cache region 342. When the application program requests the third data and tries to process the third data at the time point $C_3$, the memory system can prepare the third data in advance by reading the third data from the nonvolatile memory device (IO_S3) and store the third data in the buffer (Buf_S3). Accordingly, when the memory system 110 outputs the third data read in advance from the buffer to the application program, the application program can process the third data without a significant delay or waiting (C3). In this method, in relation to the third data, it is possible to completely hide the operation margin for the readahead operation performed inside the memory system 110. That is, performance of the data processing system can be improved depending on where data target for the readahead operation is stored in a memory device or a data buffer having faster or slower speed for data input/output.

Figure 20:
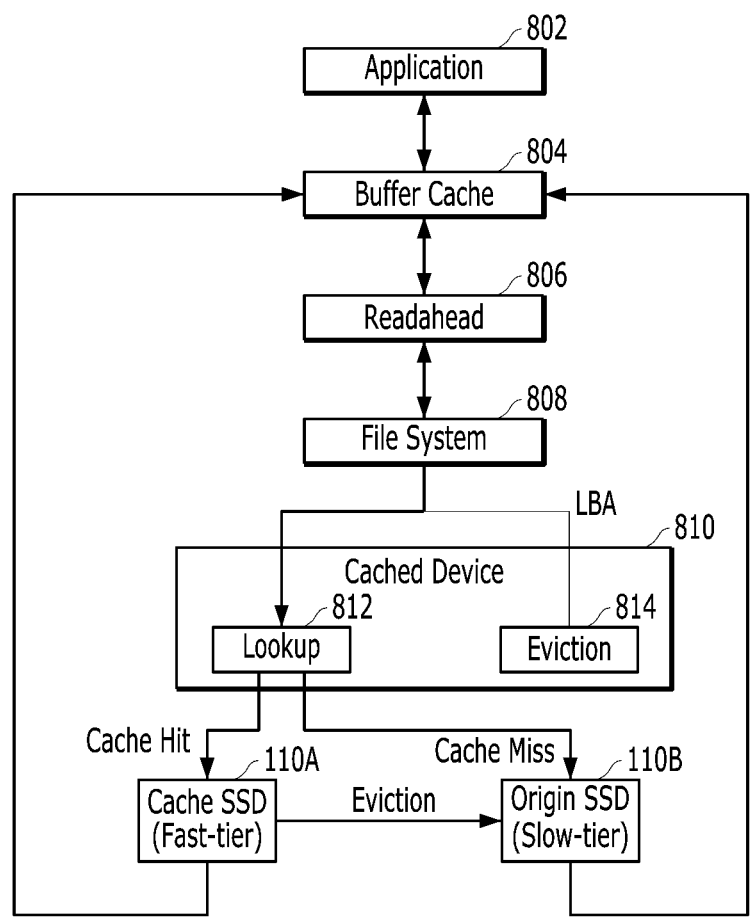
FIG. 20 illustrates a first example of a system supporting the readahead operation according to an embodiment of the present disclosure.

FIG. 20 illustrates a first example of a system supporting the readahead operation according to an embodiment of the present disclosure.

Referring to FIG. 20, the system can include an application 802 that generates a read command or a write command, and a plurality of memory systems 110A, 110B that store data in response to the write command and outputs stored data in response to the read command. The plurality of memory systems 110A, 110B can have a different data input/output speed. For example, the first memory system 110A among the plurality of memory systems 110A, 110B can have a faster data input/output speed than the second memory system 110B.

First, the system may check whether data corresponding to a read command generated by the application 802 is included in the buffer cache memory 804. When the data corresponding to the read command cannot be found in the buffer cache memory 804, the system may transmit the read command to the readahead control circuitry 806. The readahead control circuitry 806 can not only perform an operation for obtaining the data corresponding to the read command from the plurality of memory systems 110A, 110B, but also can read or obtain in advance other data related to the data and store the other data in the buffer cache memory 804.

The readahead control circuitry 806 can transmit file information to the file system 808, so that the data corresponding to the read command and related data could be secured and obtained in advance. The file system 808 can convert the file information, transmitted from the readahead control circuitry 806, into device information which corresponds to the plurality of memory systems 110A, 110B.

The cache manager 810 that receives the device information for a read operation from the file system 808 can include a lookup table 812 and an eviction circuitry 814. The cache manager 810 can check where data corresponding to the device information is stored among the plurality of memory systems 110A, 110B by referring to the lookup table 812. The eviction circuitry 814 in the cache manager 810 can determine whether to keep or release or evict the data stored in the buffer cache memory 804 to secure an empty space for storing new data in the buffer cache memory 804. The eviction circuitry 814 can evict some of the data stored in the buffer cache memory 804 according to a preset policy based on a logical address (LBA) received from the file system 808. For example, the eviction circuitry 814 can remove data stored in the buffer cache memory 804 according to a policy such as Least Recently Used (LRU) or Least Frequently Used (LFU).

After checking the location of the data based on the lookup table 812, the system can read the data stored in the plurality of memory systems 110A, 110B and store the data in the buffer cache memory 804. In this case, a time required for reading the data stored in the plurality of memory systems 110A, 110B and storing the data in the buffer cache memory 804 may vary depending on a data input/output speed of the memory system in which the data is stored. Referring to FIGS. 18 to 19, such a difference may cause a difference in performance of data input/output operations performed in response to a read command generated by the application 802.

According to an embodiment, the system can change a location of data in response to the effect of the readahead operation of the data stored in the plurality of memory systems 110A, 110B having different data input/output performance. For example, when the application 802 generates a read command for data after the data has been read in advance into the buffer cache memory 804 by the readahead control circuitry 806, the data prepared in the buffer cache memory 804 can be delivered into the application 802. This case can be understood as a cache hit. On the other hand, although data is read in advance by the readahead control circuitry 806 and stored in the buffer cache memory 804, the application 802 may not generate a read command for the corresponding data. This case can be understood as a cache miss.

For example, the system can store first data corresponding to a cache hit in the first memory system 110A having a higher data input/output speed among the plurality of memory systems 110A, 110B. Conversely, the system can store the second data corresponding to a cache miss in the second memory system 110B having a slower data input/output speed among the plurality of memory systems 110A, 110B. The system may give the first data corresponding to the cache hit a higher priority than the second data corresponding to the cache miss. Further, if it is determined that the space for storing data in the first memory system 110A is insufficient, the system could move data stored in the first memory system 110A to the second memory system 110B based on a priority assigned to the data. According to an embodiment, the priority of data can be determined according to a cache memory management policy such as a cache hit or a cache miss, least recently used (LRU) or least frequently used (LFU).

Figure 21:
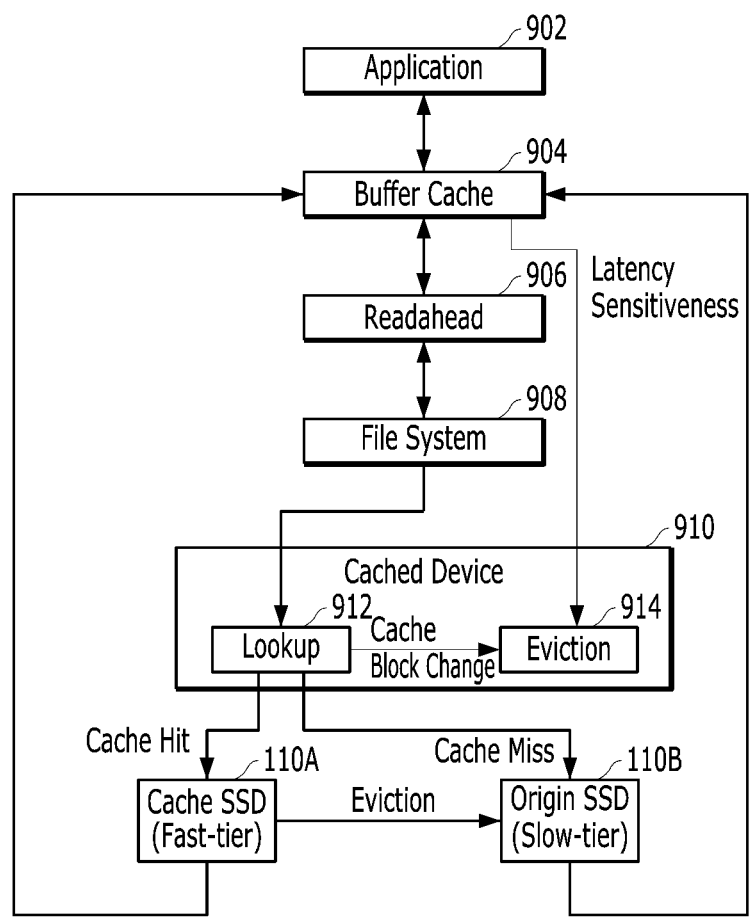
FIG. 21 illustrates a second example of a system supporting the readahead operation according to an embodiment of the present disclosure.

FIG. 21 illustrates a second example of a system supporting the readahead operation.

Referring to FIG. 21, the system can include an application 902 that generates a read command or a write command, and a plurality of memory systems 110A, 110B that store data in response to the write command and output stored data in response to the read command. The plurality of memory systems 110A, 110B can have a different data input/output speed. The system can also include a buffer cache memory 904, readahead control circuitry 906, a file system 908, and a cache manager 910. The cache manager 910 can include a lookup table 912 and an eviction circuitry 914. The system illustrated in FIG. 21 may include substantially the same components as the system illustrated in FIG. 20. However, regarding an operation of managing the buffer cache memory 904, there are differences between the systems described with reference to FIGS. 20 and 21. Hereinafter, the system will be described based on these differences.

Referring to FIG. 20, the eviction circuitry 914 can determine a priority of data corresponding to the logical address LBA transmitted from the file system 908. For example, whether data corresponding to a specific logical address (LBA) has been recently used or how often the data has been used can be determined based on the logical address (LBA) transmitted from the file system 908. On the other hand, referring to FIG. 21, the eviction circuitry 914 may evict data stored in the buffer cache memory 904 based on information regarding latency sensitiveness transmitted from the buffer cache memory 904. Here, the latency sensitiveness can be determined from the buffer cache memory 804 based on two time points: a first time point at which data is stored in the buffer cache memory 904 through a readahead operation and the second time point at which the application 902 requests the data.

According to an embodiment, a processor, a control unit, or a management unit for the buffer cache memory 804 can check the first time point and the second time point and store the first time point and the second time point in the buffer cache memory 804.

The eviction circuitry 914 can check an address (a location, etc. in storage) of data based on the lookup table 912, and determine a priority based on the latency sensitiveness transmitted from the processor, the control unit, or the management unit for the buffer cache memory 904. The eviction circuitry 914 can determine when to evict or release the corresponding data from the buffer cache memory 904 based on the latency sensitiveness or the priority of the data. For example, an order of eviction from the cache memory 904 could be adjusted.

Moreover, the cache manager 910 can change the location of the data based on the latency sensitivity. For example, based on a first time point and a second time point regarding specific data, if a time difference between the two time points of data is shorter than a preset reference, the data can be stored in the first memory system 110A having a faster data input/output speed. Conversely, if the time difference between the two time points is longer than a preset reference, the data may be stored in the second memory system 1106 having a slower data input/output speed. When the second time point is earlier than the first time point, the data can be stored in the first memory system 110A having a faster data input/output speed.

Figure 22:
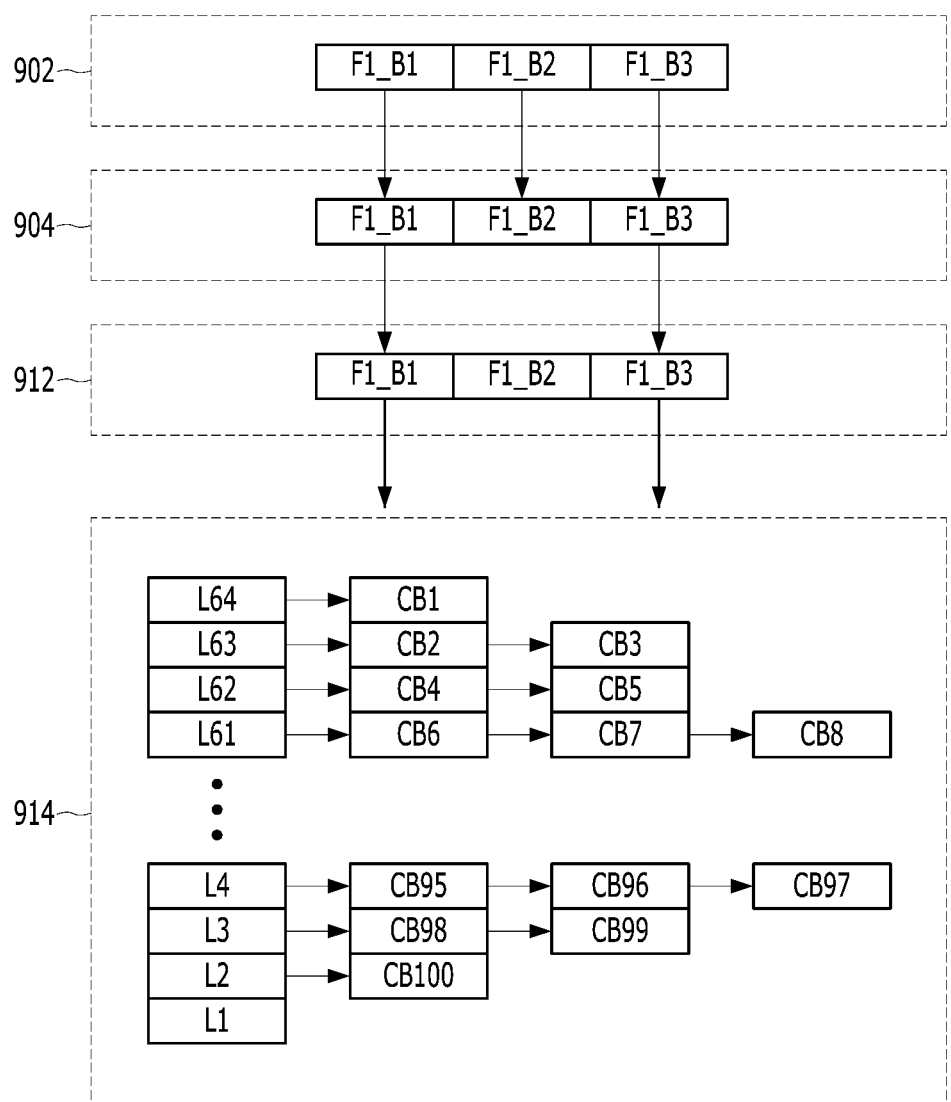
FIG. 22 illustrates the readahead operation in the system shown in FIG. 21 according to an embodiment of the present disclosure.

FIG. 22 illustrates the readahead operation in the system shown in FIG. 21 according to an embodiment of the present disclosure.

Referring to FIG. 22, the application 902 may generate read commands for three data blocks F1_B1, F1_B2, F1_B3. In response to the read commands of the application 902, the system may check whether there are three data blocks F1_B1, F1_B2, F1_B3 among data stored in the buffer cache memory 904 through a readahead operation.

For example, although the second data block F1_B2 is stored in the buffer cache memory 904, the first data block F1_B1 and the third data block F1_B3 might not be stored. The second data block F1_B2 may be a case of a cache hit, and the first data block F1_B1 and the third data block F1_B3 may be cases of a cache miss. Because the second data block F1_B2 is stored in the buffer cache memory 904, the application 902 can obtain the second data block F1_B2 stored in the buffer cache memory 904. However, the system needs to read the first data block F1_B1 and the third data block F1_B3 from the plurality of memory systems 110A, 110B.

The system can check where the first data block F1_B1 and the third data block F1_B3 are stored by referring to the lookup table 912. Then, the system can obtain the first data block F1_B1 and the third data block F1_B3 from the plurality of memory systems 110A, 110B and stores the first data block F1_B1 and the third data block F1_B3 in the buffer cache memory 904. The application 902 can acquire the first data block F1_B1 and the third data block F1_B3 from the buffer cache memory 904.

After the system obtains the first data block F1_B1 and the third data block F1_B3 from the plurality of memory systems 110A, 110B through the lookup table 912 and stores the first data block F1_B1 and the third data block F1_B3 in the buffer cache memory 904, the eviction circuitry 914 can manage and control how long the first data block F1_B1 and the third data block F1_B3 wait for a call in the buffer cache memory 904.

Data stored in the buffer cache memory 904 can be stored in a preset size or unit (e.g., cache block (CB)). Also, each data block may have a priority. The system can set a priority for each data block based on latency sensitiveness. For example, the first data block CB1 to the 100th data block CB100 can be included in the buffer cache memory 904 according to a priority.

Referring to FIG. 22, the eviction circuitry 914 can include a plurality of queues corresponding to priorities. For example, an eviction level can be divided into 64 levels from L1 to L64, and each data block from the first data block CB1 to the 100th data block CB100 can have a different eviction level. For example, the second data block CB2 among the 100 data blocks has a $63^{rd}$ level as the second highest priority among the 64 levels, and the 100th data block CB100 among the 100 data blocks has the second level L2 which is the second lowest priority among the 64 levels. According to an embodiment, data having a first level (L1) is most likely to be evicted from the buffer cache memory 904, and data having a 64th level (L64) is least likely to be evicted from the buffer cache memory 904. In this case, the 100th data block CB100 having the $2^{nd}$ level may be evicted from the buffer cache memory 904 earlier than the second data block CB2 having the $63^{rd}$ level. According to another embodiment, the data having a first level (L1) is least likely to be evicted from the buffer cache memory 904, and the data having a 64th level (L64) is most likely to be released or evicted from the buffer cache memory 904. In this case, the 100th data block CB100 having the $2^{nd}$ level may be evicted from the buffer cache memory 904 faster than the second data block CB2 having the $63^{rd}$ level A preset number of data may exist in each level, and data having the same level may be evicted in a least recently used (LRU) method. For example, if the second data block CB2 among the data blocks having the $63^{rd}$ level has been more recently used than the third data block CB3, the third data block CB3 may be evicted earlier from the buffer cache memory 904 than the second data block CB2. For example, when the most recently used one is the 95th data block CB95 and the oldest used one is the 97th data block CB97 among three data blocks CB95, CB96, CB97 having the fourth level, the 97th data block CB97 may be evicted earlier than the 95th data block CB95.

Moreover, the priority or the eviction level of the 97th data block CB97 can be adjusted or changed based on latency sensitivity. For example, if the eviction level of the 97th data block CB97 is changed from the fourth level L4 into the fifth level L5, the sixth level L6, or higher, an evicting time of the 97th data block CB97 from the buffer cache memory 904 can be postponed.

Figure 23:
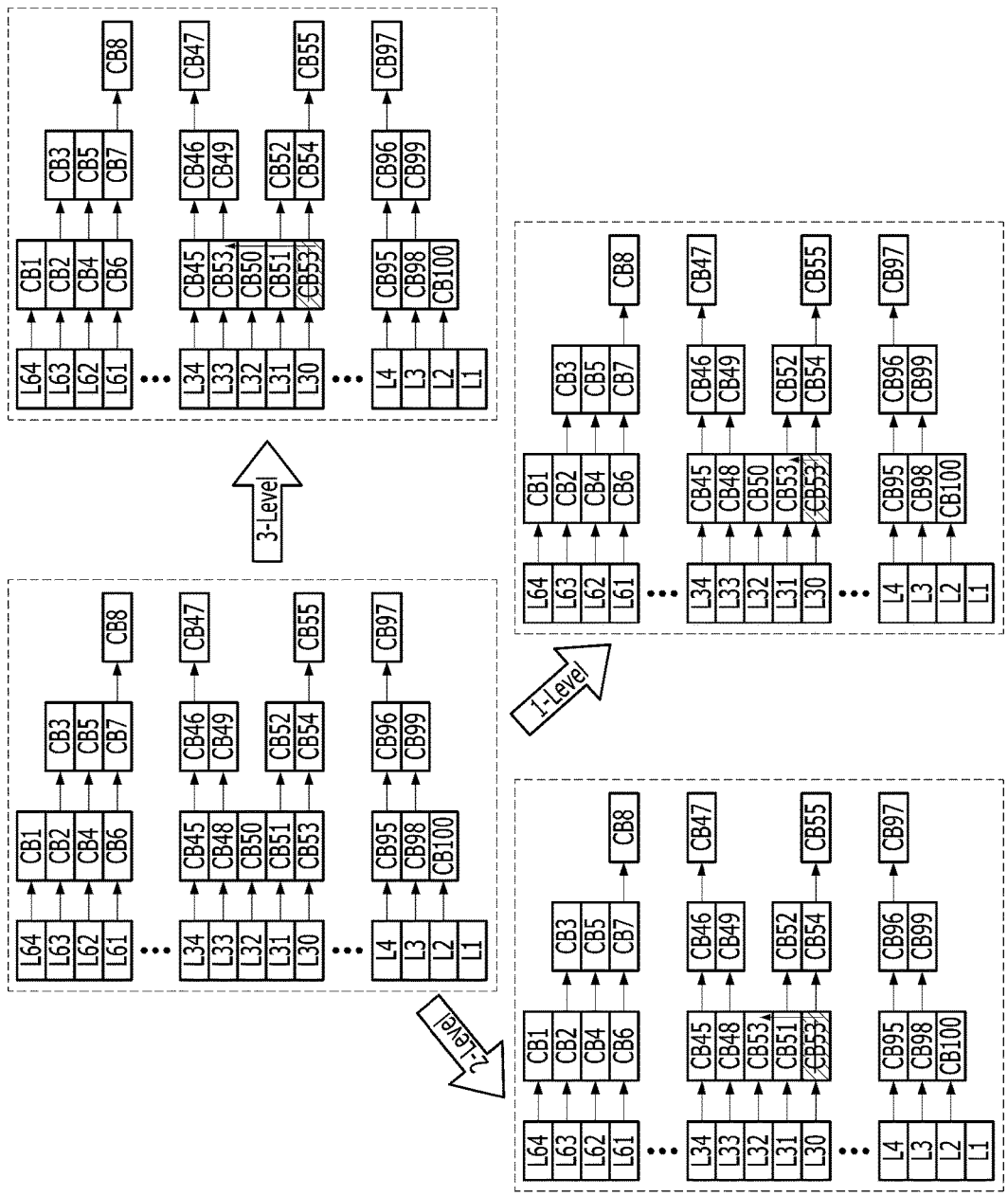
FIG. 23 illustrates a cache memory management method corresponding to a level change of latency sensitiveness according to an embodiment of the present disclosure.

FIG. 23 illustrates a cache memory management method corresponding to a level change of latency sensitiveness according to an embodiment of the present disclosure.

When a specific data block CBxx is stored in the buffer cache memory 904, the eviction circuitry 914 can assign one of the first level L1 to the 64th level based on latency sensitiveness regarding the specific data block CBxx. For example, if the latency sensitiveness of the specific data block CBxx is substantially the same as a preset criterion, the eviction circuitry 914 may assign a $32^{nd}$ level L32 (e.g., an intermediate level) to the specific data block CBxx. If the latency sensitiveness of the specific data block CBxx is less than the preset criterion, the eviction circuitry 914 can assign a lower level (e.g., a $30^{th}$ level) than the 32nd level L32 (the intermediate value) to the specific data block CBxx. When the latency sensitiveness of the specific data block CBxx is greater than the preset criterion, the eviction circuitry 914 can assign a higher level (e.g., a $34^{th}$ level) than the 32nd level L32 (the intermediate value) to the specific data block CBxx.

Referring to FIG. 23, the first data block CB1 to the 100th data block CB100 can be stored in the buffer cache memory 904. The 53rd data block CB53 may have a $30^{th}$ level. The eviction level of the 53rd data block CB53 can be changed or adjusted based on latency sensitiveness. For example, the level of the 53rd data block CB53 may increase by one level to have the 31st level. Alternatively, the level of the 53rd data block CB53 may increase by 2 levels to have the 32nd level. Alternatively, the level of the 53rd data block CB53 may increase by 3 levels to have the 33rd level.

The level of the 53rd data block CB53 may be adjusted based on latency sensitiveness. When the level of the 53rd data block CB53 increases from the 30th level to the 31st, 32nd, or 33rd level, the 53rd data block CB53 can be stored in the buffer cache memory 904 for a longer time. Conversely, the level of the fifty-third data block CB53 may be lowered. When the level of the 53rd data block CB53 is lowered, the 53rd data block CB53 may be evicted from the buffer cache memory 904 earlier than when the 53rd data block CB53 has the 30th level.

According to an embodiment, the system may adjust the level of the 53rd data block CB53 based on latency sensitiveness whenever the application 902 accesses the 53rd data block CB53. Also, the more frequently used data blocks are, the more the eviction circuitry 914 needs to avoid the data blocks from being evicted from the buffer cache memory 904. The eviction circuitry 914 may control a timing at which data block is evicted from the buffer cache memory 904 by increasing or decreasing an eviction level of the data block.

Figure 24:
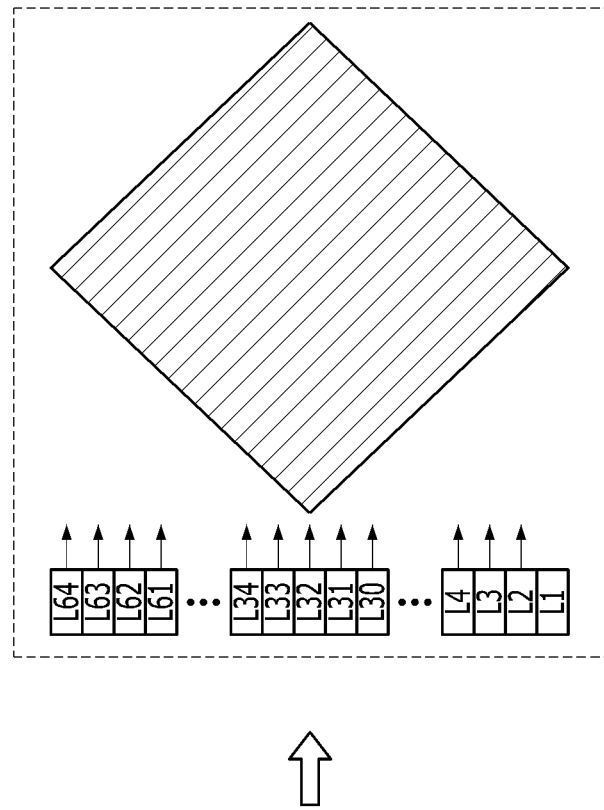
FIG. 24 illustrates a change of aging regarding cached data according to an embodiment of the present disclosure.
Figure 24:
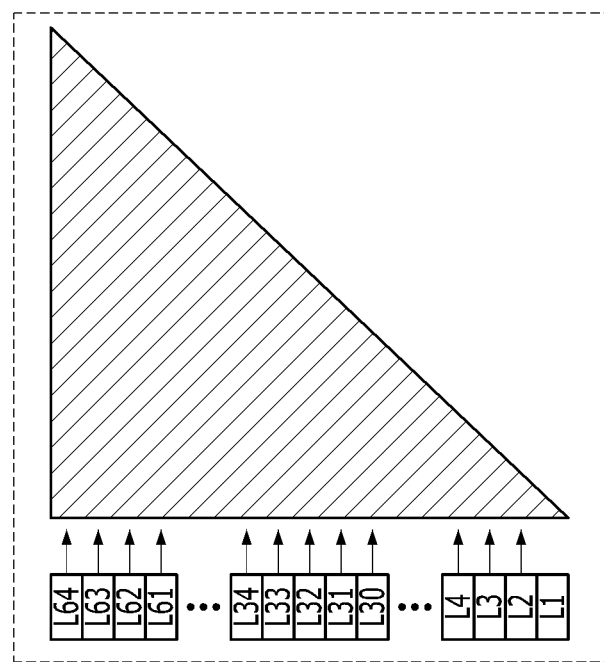

FIG. 24 illustrates a change of aging regarding cached data according to an embodiment of the present disclosure. In the embodiment shown in FIG. 24, the higher level, the later evicted.

Referring to FIG. 24, after a data block is stored in the buffer cache memory 904, the application 902 can access the stored data block. According to an embodiment, as the application 902 frequently accesses a data block stored in the buffer cache memory 904, an eviction level of the data block can increase. On the other hand, the eviction level of the data block to which the application 902 is not accessed may be lowered. Through these processes, data blocks having the 64th level, which is the highest level, may be stored in the buffer cache memory 904 can be kept for the longest time. On the other hand, data blocks corresponding to the first level, which is the lowest level, may have the shortest time stored in the buffer cache memory 904.

As time passes, the number of data blocks having the 64th level can increase. When the number of data blocks having the 64th level increases, it may be difficult to distinguish priorities between the data blocks having the 64th level. As time goes by, the number of data blocks having a higher-level can increase. Then, it becomes difficult to distinguish a priority between data blocks having a higher-level, and it becomes difficult to efficiently manage the buffer cache memory 904.

On the other hand, after the system stores the data block in the buffer cache memory 904, the system can adjust a priority of data block, based on latency sensitiveness for the data block, whenever the application 902 accesses the stored data block. In addition, the system may set an eviction level of a data block by comparing the latency sensitiveness of the data block with a reference. Also, referring to FIG. 23, the system can adjust a change degree of the eviction level corresponding to latency sensitiveness.

According to an embodiment, when the number of data blocks belonging to a specific level or a specific range of levels is greater than those belonging to other levels, the system may adjust the change degree of the eviction level corresponding to the latency sensitiveness. Through this, a time stored in the buffer cache memory 904 of the data block having a higher-level can be reduced. That is, a data block frequently accessed by the application 902 might not have a highest level. For example, when the application 902 desires a specific data block, the later the corresponding data block is stored in the buffer cache memory 904, the higher the eviction level of the corresponding data. Conversely, if the application 902 accesses a specific data block while the data block is continuously stored in the buffer cache memory 904, the level of the corresponding data block might be lowered. The system can adjust the eviction level corresponding to the latency sensitiveness. As time passes and even though the data access of the application 902 increases, the number of data blocks having the highest level, which is the 64th level L64, or the lowest level, which is the first level L1, might not be increased significantly.

In addition, the system can continuously perform a balancing or rebalancing operation, so that the number of data blocks having an intermediate level is greater than the number of data blocks having the highest level, which is the 64th level L64, or the lowest level, which is the first level L1. For example, the system may determine whether the number of data blocks corresponding to the upper 20 levels exceeds 50% of the total to determine whether the data blocks are concentrated in the upper levels. As the system continuously performs the balancing or rebalancing operation on eviction levels of data blocks stored in the buffer cache memory 904, timings of evicting data blocks from the buffer cache memory 904 could be effectively controlled even though the number of times the application 902 accesses the stored data blocks increases as time passes.

As above described, the memory system according to an embodiment of the present disclosure can improve data I/O performance while performing data I/O operations corresponding to commands input from an external device.

In addition, the memory system according to an embodiment of the present disclosure can efficiently manage resources used in performing data input/output operations and suppress unnecessary consumption of resources to improve data input/output performance.

In addition, the memory system according to an embodiment of the present disclosure can improve efficiency of the readahead operation to advance a timing of transmitting read data requested by a host from the memory system to the host of the data processing system.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory system, comprising:
   a memory device including plural storage regions including plural non-volatile memory cells and having a different data input/output speed; and
   a controller coupled to the memory device via at least one data path and configured to:
   perform a readahead operation in response to a read request input from an external device,
   determine a data attribute regarding readahead data stored in a buffer, included in the controller, through the readahead operation, based on a time difference between reception of the read request and completion of the readahead operation, and
   store the readahead data in one of the plural storage regions based on the data attribute.

2. The memory system according to claim 1, wherein a first storage region among the plural storage regions has a faster data input/output speed than a second storage region among the plural storage regions.

3. The memory system according to claim 2, wherein the controller is configured to:
   store the readahead data corresponding to the read request in the first storage region when the readahead data has a smaller size than a preset value; and
   store the readahead data corresponding to the read request in the second storage region when the readahead data has a bigger size than or equal to the preset value.

4. A memory system, comprising:
   plural memories having a different data input/output speed; and
   a controller configured to:
   store readahead data obtained from the plural memories via a readahead operation in a buffer included in the controller, and
   output read data among the readahead data stored in the buffer based on reception of a read request input from an external device,
   wherein the controller is further configured to:
   determine a priority regarding the readahead data obtained by the readahead operation, based on a time difference between reception of the read request and completion of the readahead operation, and
   store the readahead data in one of the plural memories based on the priority.

5. The memory system according to claim 4,
   wherein the controller is configured to employ a virtual file system that associates a logical address scheme used by an external device and a physical address scheme for identifying locations of a plurality of non-volatile memory cells included in the plural memories and forms a virtual data structure based on a correlation corresponding to a data attribute or a data pattern of data stored in the plural memories, and
   wherein the virtual data structure includes a depth level among plural depth levels of the correlation, which is assigned to the data stored in the plural memories.

6. The memory system according to claim 5, wherein the controller is configured to, when the read request is input, perform the readahead operation to obtain data having a higher depth level than data corresponding to the read request.

7. The memory system according to claim 4, wherein the controller is configured to:
   determine the priority based on a size of data corresponding to the read request,
   store the readahead data corresponding to the read request in a first memory among the plural memories, when the readahead data has a smaller size, and
   store the readahead data corresponding to the read request in a second memory having a slower data input/output speed than the first storage region among the plural memories, when the readahead data has a larger size.

8. The memory system according to claim 4, wherein the controller is configured to:
   store the readahead data corresponding to the read request in a first memory among the plural memories, when the reception of the read request is earlier than the completion of the readahead operation; and
   store the readahead data corresponding to the read request in a second memory having a slower data input/output speed than the first storage region among the plural memories, when the reception of the read request is later than the completion of the readahead operation.

9. The memory system according to claim 4, wherein a first memory has a faster data input/output speed than a second memory among the plural memories, and the first memory and the second memory can individually include at least one memory block, at least one memory plane, or at least one memory die.

10. The memory system according to claim 4, wherein the controller is configured to determine a timing of releasing or evicting the readahead data stored in the buffer based on the priority.

11. The memory system according to claim 10, wherein the controller is configured to:
assign one of plural eviction levels to the readahead data;
adjust an assigned eviction level when the readahead data is accessed; and
determine the timing of releasing or evicting the readahead data based on an adjusted eviction level.

12. The memory system according to claim 11, wherein the controller is configured to change a degree of adjusting the assigned eviction level assigned to the readahead data when an amount of the readahead data having at least one or more specific eviction level among the plural eviction levels is greater than a reference.

13. The memory system according to claim 10, wherein the controller is configured to determine the timing of releasing the readahead data based on a least recently used (LRU) policy when the readahead data stored in the cache memory has the same eviction level.

14. A data input and output system, comprising:
plural storage devices having a different data input and output speed;
a cache memory; and
a control device configured to:
store readahead data obtained from the plural storage devices via a readahead operation in the cache memory,
output read data, among the readahead data stored in the cache memory, to an application program based on reception of a read request input from the application program,
determine a readahead attribute regarding the readahead data, obtained by the readahead operation, based on a first timing of the reception and a second timing of completion of storing the readahead data in the cache memory, and
store the readahead data in one of the plural storage devices based on the readahead attribute.

15. The data input and output system according to claim 14, wherein the control device is configured to detect a pattern of read data corresponding to the read request and use the pattern to determine the readahead attribute regarding the readahead data.

16. The data input and output system according to claim 14, wherein the control device is configured to store the readahead data corresponding to the read request in a storage device having the fastest data input/output speed when the first timing is earlier than the second timing.

17. The data input and output system according to claim 14, wherein the control device is configured to determine a timing of releasing or evicting the readahead data stored in the cache memory based on a difference between the first timing and the second timing.

18. The data input and output system according to claim 14, wherein the control device is configured to assign one of plural eviction levels to the readahead data, adjust an assigned eviction level when the readahead data is accessed, and determine the timing of releasing or evicting the readahead data based on an adjusted eviction level.

19. The data input and output system according to claim 18, wherein the control device is configured to change a degree of adjusting the assigned eviction level assigned to the readahead data when an amount of the readahead data having at least one or more specific eviction level among the plural eviction levels is greater than a reference.

20. The data input and output system according to claim 14, wherein the control device is configured to determine the timing of releasing or evicting the readahead data based on a least recently used (LRU) policy when the readahead data stored in the cache memory has the same eviction level.

* * * * *